(12) United States Patent
Kato et al.

(10) Patent No.: US 9,994,214 B2
(45) Date of Patent: Jun. 12, 2018

(54) HYBRID VEHICLE

(71) Applicant: Toyota Jidosha Kabushiki Kaisha, Toyota-shi, Aichi-ken (JP)

(72) Inventors: Shunya Kato, Seto (JP); Masaya Sugai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days. days.

(21) Appl. No.: 15/596,126

(22) Filed: May 16, 2017

(65) Prior Publication Data

US 2017/0334433 A1    Nov. 23, 2017

(30) Foreign Application Priority Data

May 18, 2016 (JP) ................. 2016-099382

(51) Int. Cl.
*B60W 20/00* (2016.01)
*B60W 20/19* (2016.01)
(Continued)

(52) U.S. Cl.
CPC ............ *B60W 20/19* (2016.01); *B60K 6/365* (2013.01); *B60K 6/442* (2013.01); *B60K 6/543* (2013.01); *B60K 6/547* (2013.01); *B60L 11/187* (2013.01); *B60L 11/1861* (2013.01); *B60L 15/2054* (2013.01); *B60W 10/06* (2013.01); *B60W 10/08* (2013.01); *B60W 10/115* (2013.01);
(Continued)

(58) Field of Classification Search
CPC ...... B60W 20/10; B60W 20/30; B60W 10/06; B60W 10/08; B60W 10/115; B60W 30/18027; B60W 2510/285; B60W 2540/10; B60W 2540/12; B60W 2710/06; B60W 2710/08; B60W 2710/10; B60W 50/082; B60W 20/19; B60W 20/13; B60K 6/365; B60K 6/442; B60K 6/543; B60K 6/547; B60L 11/1861; B60L 11/187; B60L 15/2054; B60L 2240/16; B60L 2240/42; B60L 2240/44; B60L 2250/28; B60Y 220/92; B60Y 2300/188; B60Y 2300/74; F16H 3/724; F16H 37/0806; Y10S 903/93; Y10S 903/945
USPC .................................................. 180/65.265
See application file for complete search history.

(56) References Cited

U.S. PATENT DOCUMENTS 9,545,839 B2 * 1/2017 Okubo ................ B60K 6/365
9,592,727 B2 * 3/2017 Yamamoto .......... F16H 57/0413
(Continued)

FOREIGN PATENT DOCUMENTS

JP    2014-144659 A    8/2014

*Primary Examiner* — John D Walters
(74) *Attorney, Agent, or Firm* — Dinsmore & Shohl LLP

(57) ABSTRACT

A drivability target engine speed is set based on a shift stage based on an accelerator opening level and a vehicle speed and the vehicle speed, and a base driving force is set based on an accelerator required driving force and the drivability target engine speed. When an elapsed time after an accelerator depression amount increases is less than a threshold value, a correction driving force is set based on an increase in accelerator depression amount and an engine, a first motor, and a second motor are controlled such that an effective driving force obtained by adding the correction driving force to the base driving force is output to a drive shaft for a hybrid vehicle to travel.

10 Claims, 16 Drawing Sheets

(51) Int. Cl.
*B60W 20/13* (2016.01)
*B60K 6/365* (2007.10)
*B60K 6/442* (2007.10)
*B60K 6/543* (2007.10)
*B60K 6/547* (2007.10)
*B60L 11/18* (2006.01)
*B60L 15/20* (2006.01)
*B60W 10/06* (2006.01)
*B60W 10/08* (2006.01)
*B60W 10/115* (2012.01)
*B60W 50/08* (2012.01)
*F16H 3/72* (2006.01)
*F16H 37/08* (2006.01)

(52) U.S. Cl.
CPC .......... *B60W 20/13* (2016.01); *B60W 50/082* (2013.01); *F16H 3/724* (2013.01); *F16H 37/0806* (2013.01); *B60L 2240/16* (2013.01); *B60L 2240/42* (2013.01); *B60L 2240/44* (2013.01); *B60L 2250/28* (2013.01); *B60W 2510/285* (2013.01); *B60W 2540/10* (2013.01); *B60W 2540/12* (2013.01); *B60W 2710/06* (2013.01); *B60W 2710/08* (2013.01); *B60W 2710/10* (2013.01); *B60Y 2200/92* (2013.01); *B60Y 2300/188* (2013.01); *B60Y 2300/74* (2013.01); *Y10S 903/93* (2013.01); *Y10S 903/945* (2013.01)

(56) References Cited

U.S. PATENT DOCUMENTS

| | | | | |
|---|---|---|---|---|
| 9,669,819 B2 * | 6/2017 | Saito | ................ | B60W 20/10 |
| 9,718,458 B2 * | 8/2017 | Endo | ................ | B60K 6/365 |
| 9,751,523 B2 * | 9/2017 | Kato | ................ | B60W 20/14 |
| 9,758,154 B2 * | 9/2017 | Aoki | ................ | B60W 20/13 |
| 9,862,373 B2 * | 1/2018 | Kato | ................ | B60W 20/10 |
| 9,873,423 B2 * | 1/2018 | Baba | ................ | B60W 20/19 |

* cited by examiner

⟨ACCELERATOR REQUIRED DRIVING FORCE SETTING GRAPH⟩

⟨CHARGING/DISCHARGING REQUIRED POWER SETTING GRAPH⟩

<FUEL EFFICIENCY OPTIMAL ENGINE ROTATION SPEED SETTING GRAPH>

<SHIFT DIAGRAM OF AUTOMATIC GEARSHIFT IN FIRST EMBODIMENT>

⟨DRIVABILITY TARGET ENGINE ROTATION SPEED SETTING GRAPH⟩

⟨UPPER-LIMIT ENGINE POWER SETTING GRAPH⟩

<DISCHARGING POWER SETTING GRAPH>

<REFLECTION RATIO SETTING GRAPH>

⟨REFLECTION RATIO SETTING GRAPH⟩

⟨REFLECTION RATIO SETTING GRAPH⟩

HYBRID VEHICLE

CROSS-REFERENCE TO RELATED APPLICATIONS

This application claims priority to Japanese Patent Application No. 2016-099382 filed on May 18, 2016, which is incorporated herein by reference in its entirety.

BACKGROUND

1. Technical Field

The present disclosure relates to a hybrid vehicle.

2. Description of Related Art

In the related art, a hybrid vehicle in which a rotary element, which is connected to a second motor, of a planetary gear mechanism of which three rotary elements are connected to an engine, a first motor, and the second motor is connected to a drive shaft connected to vehicle wheels via a stepped gearshift has been proposed (for example, see Japanese Patent Application Publication No. 2014-144659 (JP 2014-144659 A)). Driving of such a vehicle is basically controlled as follows. First, a required driving force is set based on an accelerator depression amount by a driver and a vehicle speed, and the required driving force is multiplied by a rotation speed of the drive shaft to calculate a required power to be output from the engine. Then, a target rotation speed of the engine is set based on the required power and an operation line of the engine in which fuel efficiency is optimal (a fuel efficiency optimal operation line). Then, the engine, the first motor, the second motor, and the stepped gearshift are controlled such that the engine rotates at the target rotation speed to output the required power and the required driving force is output to the drive shaft for the vehicle to travel.

SUMMARY

In the above-mentioned hybrid vehicle, an operating point of the engine can be freely set regardless of a shift stage of the stepped gearshift. Accordingly, a change in engine rotation speed may not match a change in vehicle speed. When a driver depresses on an accelerator pedal, a power required for the engine increases and thus the engine rotation speed increases immediately but the vehicle speed does not increase rapidly. Accordingly, only the engine rotation speed increases rapidly before the vehicle speed increases. In general, a driver has a driving feeling that the engine rotation speed increases with an increase in vehicle speed. Accordingly, when only the engine rotation speed increases rapidly before the vehicle speed increases, the driver feels discomfort in terms of a driving feeling. In this regard, it may be conceived that a target rotation speed of the engine is set for each shift stage of a stepped gearshift and an upper-limit driving force is set based on the set target rotation speed of the engine to limit the required driving force. However, in this case, since the driving force output to the drive shaft depends on engine characteristics, an acceleration force may not be sufficient. Such a problem is true when a virtual speed level shift is performed in a hybrid vehicle not including a stepped gearshift.

In consideration of the above-mentioned problem, the disclosure provides a hybrid vehicle that can realize a good driving feeling and acceleration performance with respect to an accelerator operation.

According to a first aspect of the disclosure, there is provided a hybrid vehicle including an engine, a first motor, a planetary gear mechanism, a second motor, a battery, and an electronic control unit. Three rotary elements of the planetary gear mechanism are connected to an output shaft of the engine, a rotary shaft of the first motor, and a drive shaft connected to an axle of the hybrid vehicle, respectively. The second motor is configured to input and output power to and from the drive shaft. The battery is configured to exchange electric power with the first motor and the second motor. The electronic control unit is configured to: (i) set a shift stage based on an accelerator depression amount and a vehicle speed of the hybrid vehicle or a driver's operation of the hybrid vehicle; (ii) set a target rotation speed of the engine based on the shift stage and the vehicle speed; (iii) set a base driving force based on the accelerator depression amount, the vehicle speed, and the target rotation speed; (iv) set a correction driving force such that the correction driving force increases with an increase in the accelerator depression amount; and (v) control the engine, the first motor, and the second motor such that a driving force obtained by adding the correction driving force to the base driving force is output to the drive shaft for the hybrid vehicle to travel.

In the hybrid vehicle according to the disclosure, the shift stage is set based on the accelerator depression amount and the vehicle speed or the driver's operation, and the target rotation speed is set based on the shift stage and the vehicle speed. The base driving force is set based on the accelerator depression amount, the vehicle speed, and the target rotation speed, the correction driving force is set to increase as the accelerator depression amount increases, and the engine, the first motor, and the second motor are controlled such that a driving force obtained by adding the correction driving force to the base driving force is output to the drive shaft for the hybrid vehicle to travel. According to the hybrid vehicle having the above-mentioned configuration, even when a driver depresses on the accelerator pedal, it is possible to set the engine rotation speed to correspond to the shift stage and the vehicle speed and to give a better driving feeling to the driver in comparison with a case in which the engine rotation speed increases rapidly before the vehicle speed increases. It is possible to achieve a good acceleration force with an increase in the accelerator depression amount by the driver by using the correction driving force which is added to the base driving force. As a result, it is possible to realize both a good driving feeling and acceleration performance in response to an operation on the accelerator pedal.

In the hybrid vehicle, the electronic control unit may be configured to control the second motor such that power required for correcting the base driving force using the correction driving force is covered with power for charging and discharging the battery. According to the hybrid vehicle having this configuration, it is possible to obtain a good acceleration force without changing an output power of the engine.

In the hybrid vehicle according to the disclosure in which the power required for correcting the driving force is covered with the power for charging and discharging the battery, the electronic control unit may be configured to set the correction driving force to decrease as the accelerator depression amount decreases. According to the hybrid vehicle having this configuration, even when the increase in accelerator depression amount is great, the correction driving force does not increase greatly when the accelerator depression amount is small, and it is thus possible to minimize a great increase in the driving force output to the drive shaft.

In the hybrid vehicle according to the disclosure in which the power required for correcting the driving force is covered with the power for charging and discharging the battery, the electronic control unit may be configured to set the correction driving force to be smaller when the vehicle speed is higher than a predetermined vehicle speed range than when the vehicle speed is in the predetermined vehicle speed range. According to the hybrid vehicle having this configuration, when the vehicle speed is high, it is possible to prevent the output power from increasing excessively and to prevent the battery from being discharged with an excessive power. The electronic control unit may be configured to set the correction driving force to be smaller when the vehicle speed is lower than the predetermined vehicle speed range than when the vehicle speed is in the predetermined vehicle speed range. According to the hybrid vehicle having this configuration, when the vehicle speed is low, it is possible to smoothly change the driving force and thus to prevent shock in the hybrid vehicle.

In the hybrid vehicle according to the disclosure in which the power required for correcting the driving force is covered with the power for charging and discharging the battery, the electronic control unit may be configured to set the correction driving force to gradually decrease with elapse of time. According to the hybrid vehicle having this configuration, it is possible to prevent the battery from being continuously discharged due to correction of the driving force.

In the hybrid vehicle according to the disclosure in which the power required for correcting the driving force is covered with the power for charging and discharging the battery, the electronic control unit may be configured to set the correction driving force to decrease as a power storage ratio decreases, power storage ratio being a ratio of dischargeable power to a full capacity of the battery. According to the hybrid vehicle having this configuration, it is possible to minimize charging and discharging of the battery to protect the battery when the power storage ratio of the battery is low.

In the hybrid vehicle according to the disclosure in which the power required for correcting the driving force is covered with the power for charging and discharging the battery, the electronic control unit may be configured to set the correction driving force to be smaller when a temperature of the battery is not in an appropriate temperature range than when the temperature of the battery is in the appropriate temperature range. According to the hybrid vehicle having this configuration, it is possible to minimize charging and discharging of the battery to protect the battery when the temperature of the battery is not in an appropriate temperature range.

In the hybrid vehicle, the electronic control unit may be configured to: (i) set a required driving force to be output to the drive shaft based on the accelerator depression amount and the vehicle speed; (ii) set a maximum power output from the engine when the engine operates at the target rotation speed as an upper-limit power; (iii) set the driving force when the upper-limit power is output to the drive shaft as an upper-limit driving force; and (iv) set a smaller driving force from among the upper-limit driving force and the required driving force as the base driving force. That is, it is possible to set a smaller driving force from among the upper-limit driving force set in consideration of the shift stage and the required driving force set without considering the shift stage as the base driving force.

In the hybrid vehicle, the shift stage may be a virtual shift stage. The hybrid vehicle may further include a stepped gearshift attached between the drive shaft and the planetary gear mechanism. The shift stage may be a shift stage of the stepped gearshift or a shift stage obtained by adding a virtual shift stage to the shift stage of the stepped gearshift. Here, the "shift stage obtained by adding a virtual shift stage to the shift stage of the stepped gearshift" indicates that the shift stages of the stepped gearshift and the virtual shift stages are combined to achieve a total of four shift stages by adding virtual shift stages in two steps in the planetary gear mechanism to the shift stages of the stepped gearshift in two steps and to achieve a total of eight shift stages by adding the virtual shift stages in two steps in the planetary gear mechanism to the shift stages of the stepped gearshift in four steps. Accordingly, it is possible to utilize a desired number of shift stages.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be sequentially described as a first embodiment and a second embodiment.

Figure 1:
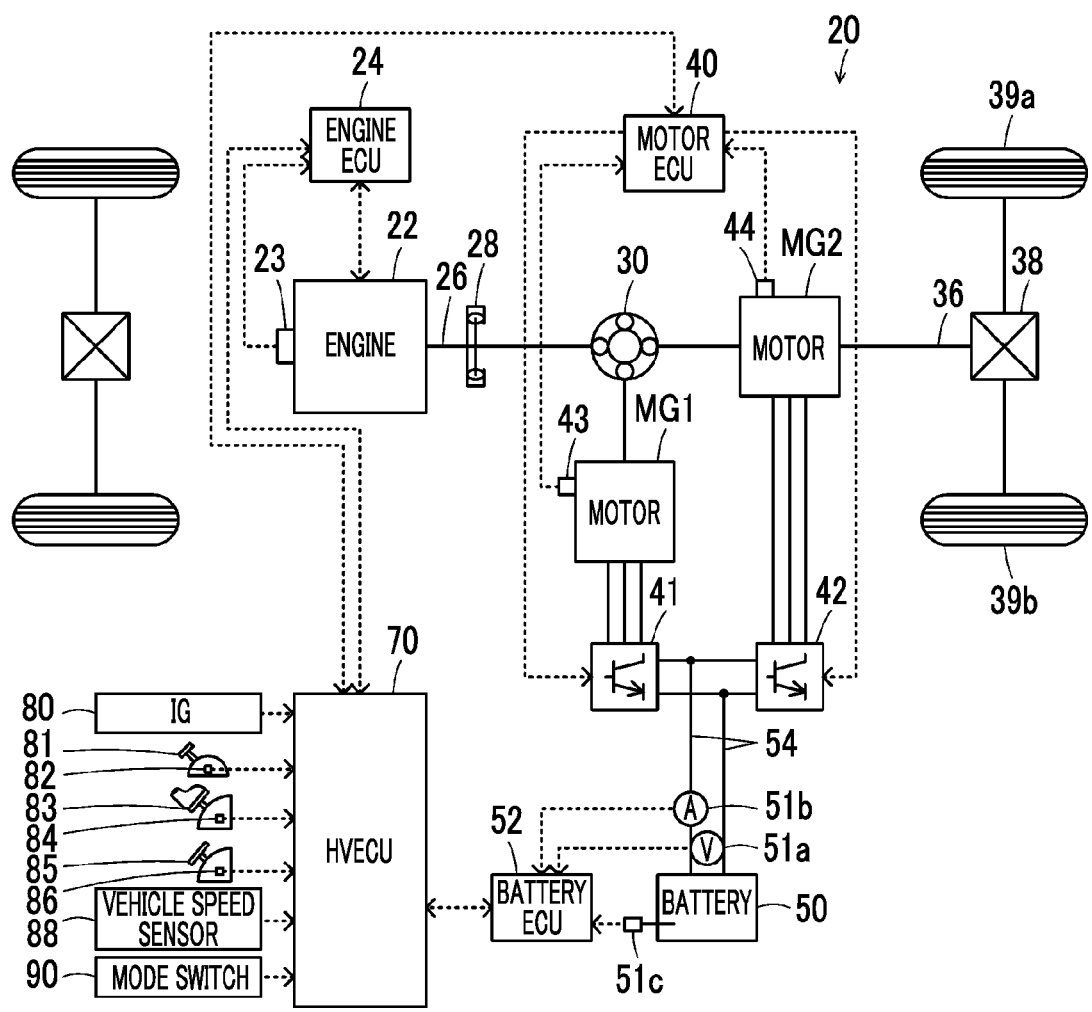
FIG. 1 is a diagram schematically illustrating a configuration of a hybrid vehicle 20 according to a first embodiment.

FIG. 1 is a diagram schematically illustrating a configuration of a hybrid vehicle 20 according to a first embodiment of the disclosure. As illustrated in the drawing, the hybrid vehicle 20 according to the first embodiment includes an engine 22, a planetary gear set 30, a first motor MG1, a second motor MG2, a first inverter 41, a second inverter 42, a battery 50, and a hybrid electronic control unit (hereinafter referred to as "HVECU") 70.

The engine 22 is constituted by an internal combustion engine that outputs power using gasoline, diesel, or the like as fuel. Operation of the engine 22 is controlled by an engine electronic control unit (hereinafter referred to as an "engine ECU") 24.

The engine ECU 24 is constituted by a microprocessor centered on a CPU and includes a ROM that stores a processing program, a RAM that temporarily stores data, input and output ports, and a communication port in addition to the CPU. Signals from various sensors required for controlling the driving of the engine 22 are input to the engine ECU 24 via the input port. Examples of the signals input to the engine ECU 24 include a crank angle θcr from a crank position sensor 23 that detects a rotational position of a crank shaft 26 of the engine 22 and a throttle opening level TH from a throttle valve position sensor that detects a position of a throttle valve. Various control signals for controlling the driving of the engine 22 are output from the engine ECU 24 via the output port. Examples of the signals output from the engine ECU 24 include a drive control signal to a throttle motor that adjusts the position of the throttle valve, a drive control signal to a fuel injection valve, and a drive control signal to an ignition coil integrated with an igniter. The engine ECU 24 is connected to the HVECU 70 via the communication port, controls driving of the engine 22 using a control signal from the HVECU 70, and outputs data on an operating state of the engine 22 to the HVECU 70 if necessary. The engine ECU 24 calculates a rotation speed of the crank shaft 26, that is, a rotation speed Ne of the engine 22, based on a crank angle θcr from the crank position sensor 23.

The planetary gear set 30 is constituted by a single pinion type planetary gear mechanism. A rotor of the first motor MG1 is connected to a sun gear of the planetary gear set 30. A drive shaft 36 connected to driving wheels 39a and 39b via a differential gear 38 is connected to a ring gear of the planetary gear set 30. The crank shaft 26 of the engine 22 is connected to a carrier of the planetary gear set 30 via a damper 28.

The first motor MG1 is constituted, for example, by a synchronous generator-motor and the rotor thereof is connected to the sun gear of the planetary gear set 30 as described above. The second motor MG2 is constituted, for example, by a synchronous generator-motor and the rotor thereof is connected to the drive shaft 36. The first inverter 41 and the second inverter 42 are connected to the battery 50 via power lines 54. The first motor MG1 and the second motor MG2 are rotationally driven by controlling switching of a plurality of switching elements, which are not illustrated, of the first inverter 41 and the second inverter 42 by a motor electronic control unit (hereinafter referred to as a "motor ECU") 40.

The motor ECU 40 is constituted by a microprocessor centered on a CPU and includes a ROM that stores a processing program, a RAM that temporarily stores data, input and output ports, and a communication port in addition to the CPU. Signals from various sensors required for controlling driving of the first motor MG1 and the second motor MG2 are input to the motor ECU 40 via the input port. Examples of the signals input to the motor ECU 40 include rotational positions θm1 and θm2 from rotational position sensors 43 and 44 that detect rotational positions of the rotors of the first motor MG1 and the second motor MG2 and phase currents from current sensors that detect currents flowing in phases of the first motor MG1 and the second motor MG2. Switching control signals to switching elements, which are not illustrated, of the first inverter 41 and the second inverter 42 are output from the motor ECU 40 via the output port. The motor ECU 40 is connected to the HVECU 70 via the communication port, controls driving of the first motor MG1 and the second motor MG2 using a control signal from the HVECU 70, and outputs data on driving states of the first motor MG1 and the second motor MG2 to the HVECU 70 if necessary. The motor ECU 40 calculates the rotation speeds Nm1 and Nm2 of the first motor MG1 and the second motor MG2 based on the rotational positions θm1 and θm2 of the rotors of the first motor MG1 and the second motor MG2 from the rotational position sensors 43 and 44.

The battery 50 is constituted, for example, by a lithium ion secondary battery or a nickel hydride secondary battery and is connected to the first inverter 41 and the second inverter 42 via the power lines 54. The battery 50 is managed by a battery electronic control unit (hereinafter referred to as a "battery ECU") 52.

The battery ECU 52 is constituted by a microprocessor centered on a CPU and includes a ROM that stores a processing program, a RAM that temporarily stores data, input and output ports, and a communication port in addition to the CPU. Signals from various sensors required for managing the battery 50 are input to the battery ECU 52 via the input port. Examples of the signals input to the battery ECU 52 include a battery voltage Vb from a voltage sensor 51*a* disposed between terminals of the battery 50, a battery current Ib from a current sensor 51*b* attached to an output terminal of the battery 50, and a battery temperature Tb from a temperature sensor 51*c* attached to the battery 50. The battery ECU 52 is connected to the HVECU 70 via the communication port and outputs data on a state of the battery 50 to the HVECU 70 if necessary. The battery ECU 52 calculates a power storage ratio SOC based on an integrated value of the battery current Ib from the current sensor 51*b*. The power storage ratio SOC is a ratio of a capacity of a dischargeable power of the battery 50 to a full capacity of the battery 50.

The HVECU 70 is constituted by a microprocessor centered on a CPU. The HVECU 70 includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80, a shift position SP from a shift position sensor 82 that detects an operating position of a shift lever 81, an accelerator opening level Acc from an accelerator pedal position sensor 84 that detects a depression amount of an accelerator pedal 83, and a brake pedal position BP from a brake pedal position sensor 86 that detects a depression amount of a brake pedal 85. Examples of the input signals also include a vehicle speed V from a vehicle speed sensor 88 and a mode switching control signal from a mode switch 90. As described above, the HVECU 70 is connected to the engine ECU 24, the motor ECU 40, and the battery ECU 52 via the communication port and gives and takes various control signals or data to and from the engine ECU 24, the motor ECU 40, and the battery ECU 52.

Examples of the shift position SP include a parking position (P position), a reversing position (R position), a neutral position (N position), a driving position (D position), and a manual position (M position). The manual position (M position) is provided with an upshift position (+ position) and a downshift position (− position). When the shift position SP is changed to the manual position (M position), driving of the engine 22 is controlled such that it is connected to the drive shaft 36 via an automatic gearshift of six virtual shift stages. The mode switch 90 is a switch which is used to select driving modes including a driving feeling priority mode in which fuel efficiency is slightly decreased but a driver's driving feeling (drivability or driving feeling) has priority and a normal driving mode in which fuel efficiency has priority. When the normal driving mode is selected and the shift position SP is at the driving position (D position), driving of the engine 22 and the first and second motors MG1 and MG2 are controlled such that static inertia and fuel efficiency are compatible with each other. When the driving feeling priority mode is selected and the shift position SP is at the driving position (D position), driving of the engine 22 is controlled such that the engine is connected to the drive shaft 36 via the automatic gearshift of six virtual shift stages.

The hybrid vehicle 20 according to the first embodiment having the above-mentioned configuration travels in any one of a plurality of driving modes including a hybrid driving (HV driving) mode and an electrical driving (EV driving) mode. Here, the HV driving mode is a mode in which the vehicle travels using the power from the engine 22 and the power from the first motor MG1 and the second motor MG2 while operating the engine 22. The EV driving mode is a mode in which the vehicle travels using power from the second motor MG2 without operating the engine 22.

Figure 2:
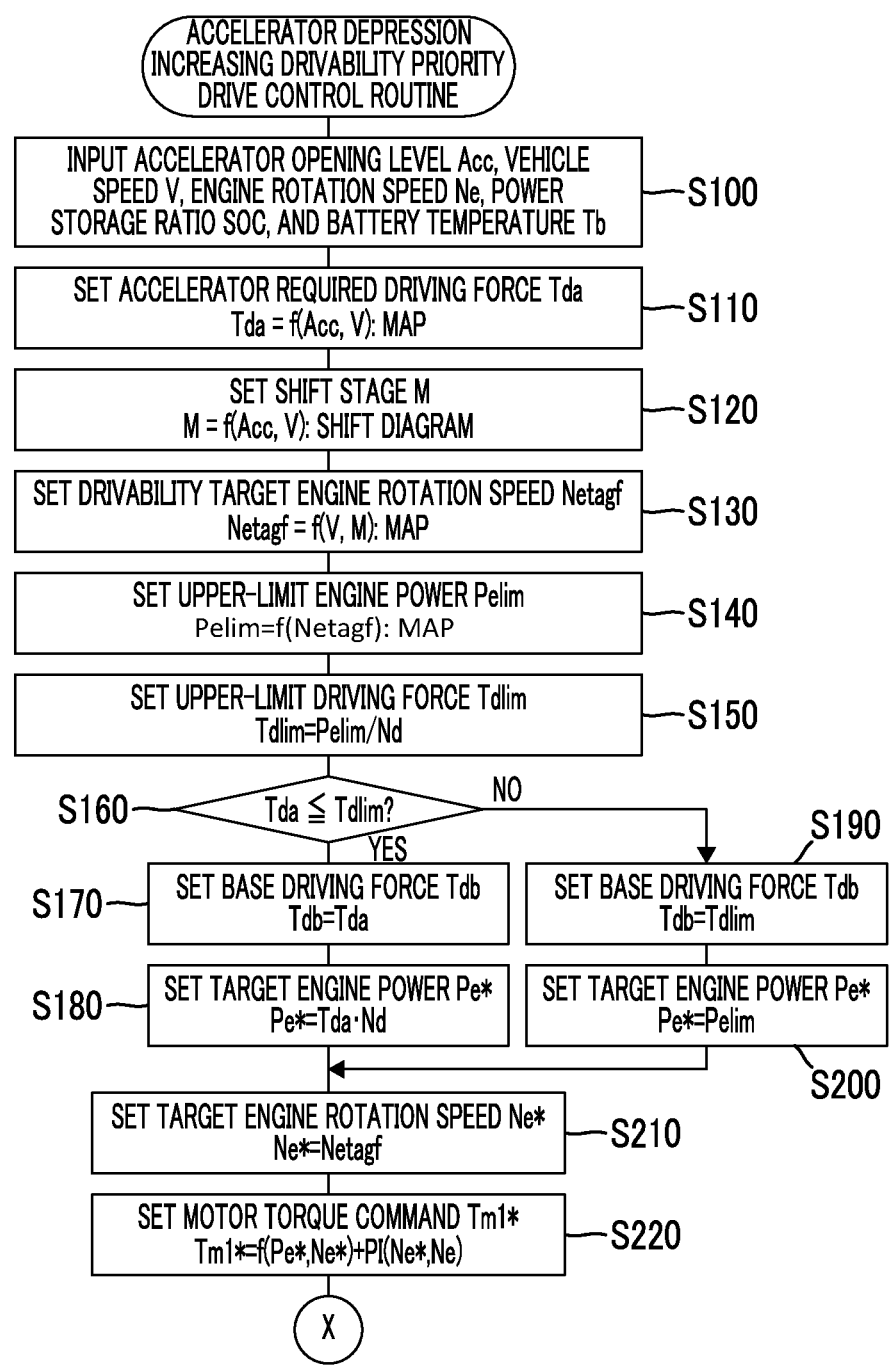
FIG. 2 is a flowchart illustrating an example of an accelerator-depression increasing drivability priority drive control routine (a first half) which is performed by a hybrid electronic control unit (HVECU) when an accelerator depression amount increases in a driving feeling priority mode and at a D position in the first embodiment.
Figure 3:
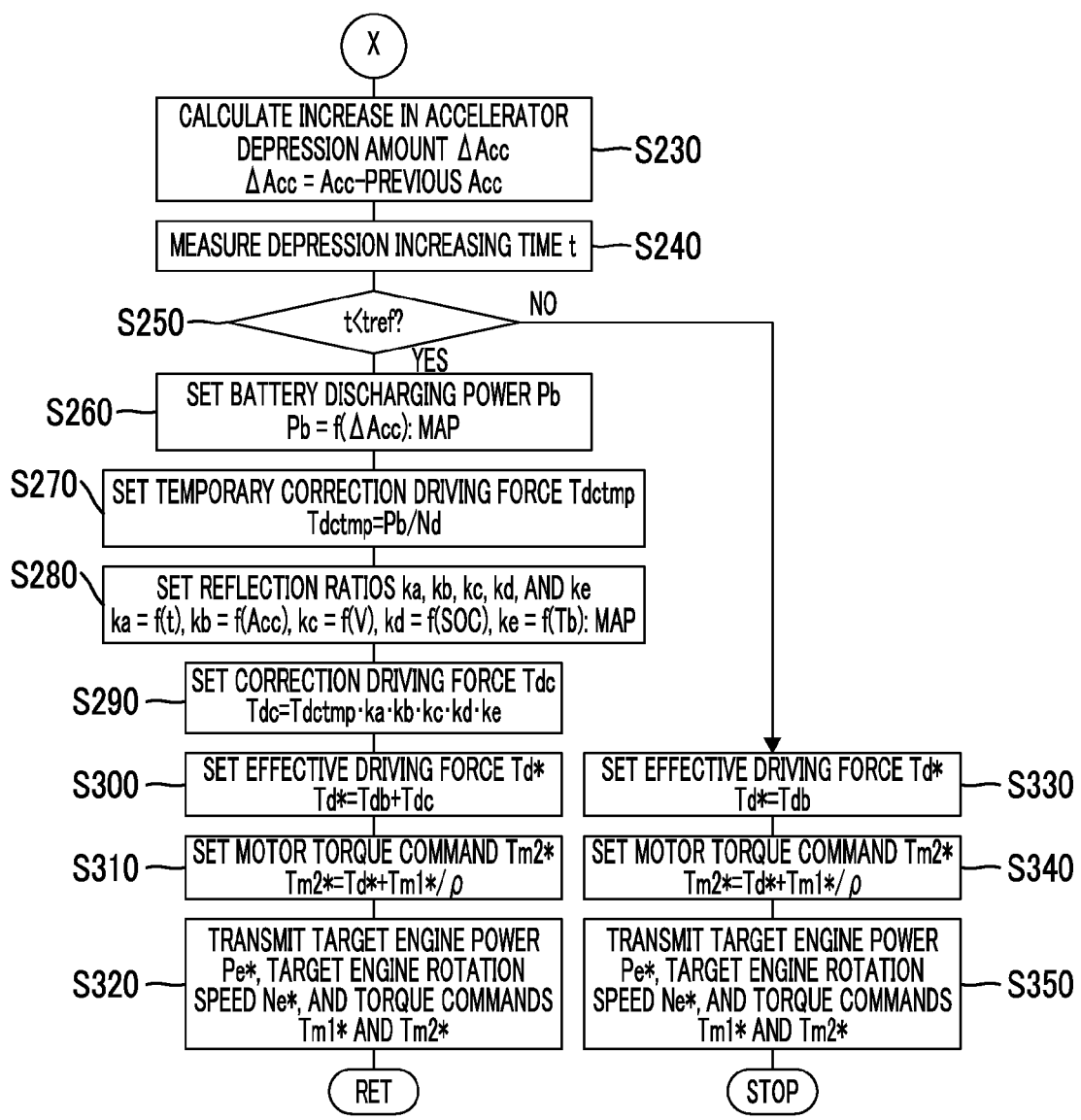
FIG. 3 is a flowchart illustrating an example of the accelerator depression increasing drivability priority drive control routine (a second half) in the first embodiment.

The operation of the hybrid vehicle 20 having the above-mentioned configuration, particularly, the operation when the driving feeling priority mode is selected by the mode switch 90, will be described below. FIGS. 2 and 3 are flowcharts illustrating an example of an accelerator depression increasing drivability priority drive control routine which is performed by the HVECU 70 when a depression amount of an accelerator pedal 83 increases in the driving feeling priority mode and at a shift position SP of the driving position (D position). This routine is repeatedly performed at predetermined times (for example, several msec) when the depression amount of the accelerator pedal 83 is increasing. Whether an operation of increasing the depression amount of the accelerator pedal 83 is performed can be determined by determining whether the accelerator opening level Acc detected by the accelerator pedal position sensor 84 is greater than the accelerator opening level detected by the accelerator pedal position sensor 84 a predetermined time previously (several msec before) in the first embodiment. Before describing drive control when the depression amount of the accelerator pedal 83 increases in the driving feeling priority mode and at the D position using the accelerator depression increasing drivability priority drive control routine illustrated in FIGS. 2 and 3, drive control in the normal driving mode and at the D positions (drive control in the HV driving mode) will be first described for the purpose of convenience of explanation.

In the normal driving mode, when the vehicle travels in the HV driving mode, drive control is performed as follows by the HVECU 70. The HVECU 70 first calculates an accelerator required driving force Tda which is required for traveling (required for the drive shaft 36) based on the accelerator opening level Acc and the vehicle speed V and sets the accelerator required driving force Tda as an effective driving force Td*. The accelerator required driving force Tda can be calculated, for example, from an accelerator required driving force setting graph illustrated in FIG. 4. Subsequently, the set effective driving force Td* is multiplied by a rotation speed Nd of the drive shaft 36 to calculate a driving required power Pedrv required for traveling. Here, a rotation speed obtained by multiplying the rotation speed Nm2 of the second motor MG2 by a conversion factor km, a rotation speed obtained by multiplying the vehicle speed V by a conversion factor kv, or the like can be used as the rotation speed Nd of the drive shaft 36. A charging/discharging required power Pb* (which has a positive value when power is discharged from the battery 50) of the battery 50 is set such that the power storage ratio SOC of the battery 50 approaches a target ratio SOC*, and a target engine power Pe* is calculated by subtracting the charging/discharging required power Pb* of the battery 50 from the driving required power Pedrv as expressed by Expression (1). The charging/discharging required power Pb* is set, for example, using a charging/discharging required power setting graph illustrated in FIG. 5. In the charging/discharging required power setting graph, a dead zone from a value S1 to a value S2 with respect to the target ratio SOC* is provided and the charging/discharging required power Pb* is set as a discharging power (power with a positive value)

when the power storage ratio SOC is greater than the upper limit value S2 of the dead zone, and is set as a charging power (power with a negative value) when the power storage ratio SOC is less than the lower limit value S1 of the dead zone.

$$Pe^* = Pedrv - Pb^* \quad (1)$$

Figure 6:
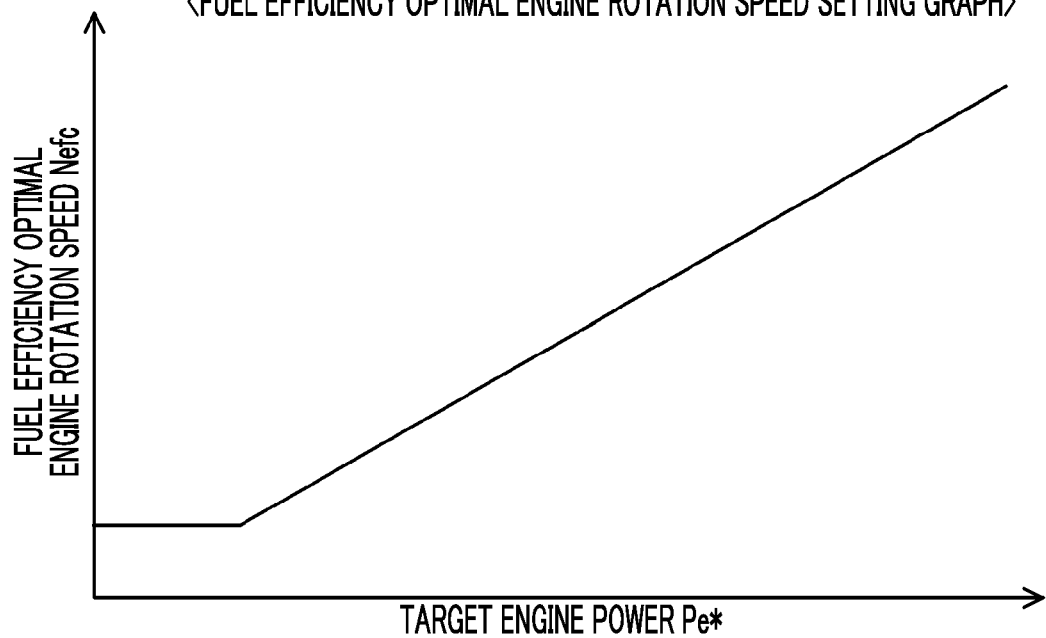
FIG. 6 is a diagram illustrating an example of a fuel efficiency optimal engine rotation speed setting graph in the first embodiment.

Then, a fuel efficiency optimal engine rotation speed Nefc is calculated using the target engine power Pe* and a fuel efficiency optimal engine rotation speed setting graph, and the fuel efficiency optimal engine rotation speed Nefc is set as the target engine rotation speed Ne*. An example of the fuel efficiency optimal engine rotation speed setting graph is illustrated in FIG. 6. The fuel efficiency optimal engine rotation speed setting graph is determined as a relationship between the target engine power Pe* and the rotation speed at which the engine 22 can be efficiently operated by experiment or the like. Since the fuel efficiency optimal engine rotation speed Nefc basically increases as the target engine power Pe* increases, the target engine rotation speed Ne* also increases as the target engine power Pe* increases. Subsequently, as expressed by Expression (2), a torque command Tm1* of the first motor MG1 is calculated using the rotation speed Ne of the engine 22, the target engine rotation speed Ne*, the target engine power Pe*, and a gear ratio ρ of the planetary gear set 30 (the number of teeth of the sun gear/the number of teeth of the ring gear). Expression (2) is a relational expression of rotation speed feedback control for causing the engine 22 to rotate at the target engine rotation speed Ne*. In Expression (2), the first term on the right side is a feedforward term, and the second and third terms on the right side are a proportional term and an integral term of a feedback term. The first term on the right side denotes a torque which is used for the first motor MG1 to receive a torque output from the engine 22 and applied to the rotary shaft of the first motor MG1 via the planetary gear set 30. "kp" of the second term on the right side denotes a gain of the proportional term, and "ki" of the third term on the right side denotes a gain of the integral term. Considering a case in which the engine 22 is in a substantially static state (when the target engine rotation speed Ne* and the target engine power Pe* are substantially constant), it can be seen that as the target engine power Pe* increases, the first term on the right side of Expression (2) decreases (the absolute value thereof increases), the torque command Tm1* of the first motor MG1 decreases (increases to the negative side), and a power of the first motor MG1 (which has a positive value when power is consumed) obtained by multiplying the torque command Tm1* of the first motor MG1 by the rotation speed Nm1 decreases (the generated power increases).

$$Tm1^* = -(Pe^*/Ne^*) \cdot [\rho/(1+\rho)] + kp \cdot (Ne^* - Ne) + ki \cdot \int (Ne^* - Ne) dt \quad (2)$$

Then, as expressed by Expression (3), a torque command Tm2* of the second motor MG2 is set by subtracting a torque (−Tm1*/ρ) output from the first motor MG1 and applied to the drive shaft 36 via the planetary gear set 30 when the first motor MG1 is driven in accordance with the torque command Tm1* from the effective driving force Td*. The torque command Tm2* of the second motor MG2 is limited to a torque limit Tm2max obtained from an output limit Wout of the battery 50 using Expression (4). As expressed by Expression (4), the torque limit Tm2max is obtained by subtracting the power of the first motor MG1, which is obtained by multiplying the torque command Tm1* of the first motor MG1 by the rotation speed Nm1, from the output limit Wout of the battery 50 and dividing the resultant value by the rotation speed Nm2 of the second motor MG2.

$$Tm2^* = Td^* + Tm1^*/\rho \quad (3)$$

$$Tm2\text{max} = (W\text{out} - Tm1^* \cdot Nm1)/Nm2 \quad (4)$$

When the target engine power Pe*, the target engine rotation speed Ne*, and the torque commands Tm1* and Tm2* of the first motor MG1 and the second motor MG2 are set in this way, the target engine power Pe* and the target engine rotation speed Ne* are transmitted to the engine ECU 24 and the torque commands Tm1* and Tm2* of the first motor MG1 and the second motor MG2 are transmitted to the motor ECU 40.

When the target engine power Pe* and the target engine rotation speed Ne* are received, the engine ECU 24 performs intake air volume control, fuel injection control, ignition control, and the like of the engine 22 such that the engine 22 operates based on received target engine power Pe* and the received target engine rotation speed Ne*. When the torque commands Tm1* and Tm2* of the first motor MG1 and the second motor MG2 are received, the motor ECU 40 performs switching control of a plurality of switching elements of the first inverter 41 and the second inverter 42 such that the first motor MG1 and the second motor MG2 are driven with the torque commands Tm1* and Tm2*.

When the target engine power Pe* is less than a threshold value Pref in the HV driving mode, it is determined that a stop condition of the engine 22 is satisfied and the operation of the engine 22 stops to transition to the EV driving mode.

In the EV driving mode, the HVECU 70 sets the effective driving force Td* in the same way as in the HV driving mode, sets the torque command Tm1* of the first motor MG1 to a value of 0, and sets the torque command Tm2* of the second motor MG2 in the same way as in the HV driving mode. The torque commands Tm1* and Tm2* of the first motor MG1 and the second motor MG2 are transmitted to the motor ECU 40. Then, the motor ECU 40 performs switching control of a plurality of switching elements of the first inverter 41 and the second inverter 42 as described above.

In the EV driving mode, when the target engine power Pe* calculated in the same way as in the HV driving mode is equal to or greater than the threshold value Pref, it is determined that a start condition of the engine 22 is satisfied and the engine 22 starts to transition to the HV driving mode.

When the depression amount of the accelerator pedal 83 increases in such a normal driving mode, the target engine power Pe* increases due to an increase of the effective driving force Td*. On the other hand, since the vehicle speed V does not increase rapidly, only the engine rotation speed Ne increases rapidly before the vehicle speed V increases. In general, a driver has a driving feeling that the engine rotation speed Ne increases with an increase in the vehicle speed V. Accordingly, when only the engine rotation speed Ne increases rapidly before the vehicle speed V increases, the driver feels discomfort in terms of a driving feeling.

Drive control when the depression amount of the accelerator pedal 83 increases in the D position in the driving feeling priority mode and at the D position will be described below with reference to the accelerator depression increasing drivability priority drive control routine illustrated in FIGS. 2 and 3. When the accelerator depression increasing drivability priority drive control routine is performed, the HVECU 70 receives the accelerator opening level Acc from the accelerator pedal position sensor 84, the vehicle speed V from the vehicle speed sensor 88, the rotation speed Ne of the engine 22, the power storage ratio SOC of the battery 50, and the battery temperature Tb (Step S100), and sets the accelerator required driving force Tda using the received accelerator opening level Acc, the received vehicle speed V, and an accelerator required driving force setting graph illustrated in FIG. 4 (Step S110). Here, as the rotation speed Ne of the engine 22, a value calculated based on the crank angle θcr from the crank position sensor 23 can be received from the engine ECU 24 by communication. As the power storage ratio SOC of the battery 50, a value calculated based on the integrated value of the battery current Ib from the current sensor 51b can be received from the battery ECU 52 by communication. As the battery temperature Tb, a value detected by the temperature sensor 51c can be received from the battery ECU 52 by communication.

Figure 7:
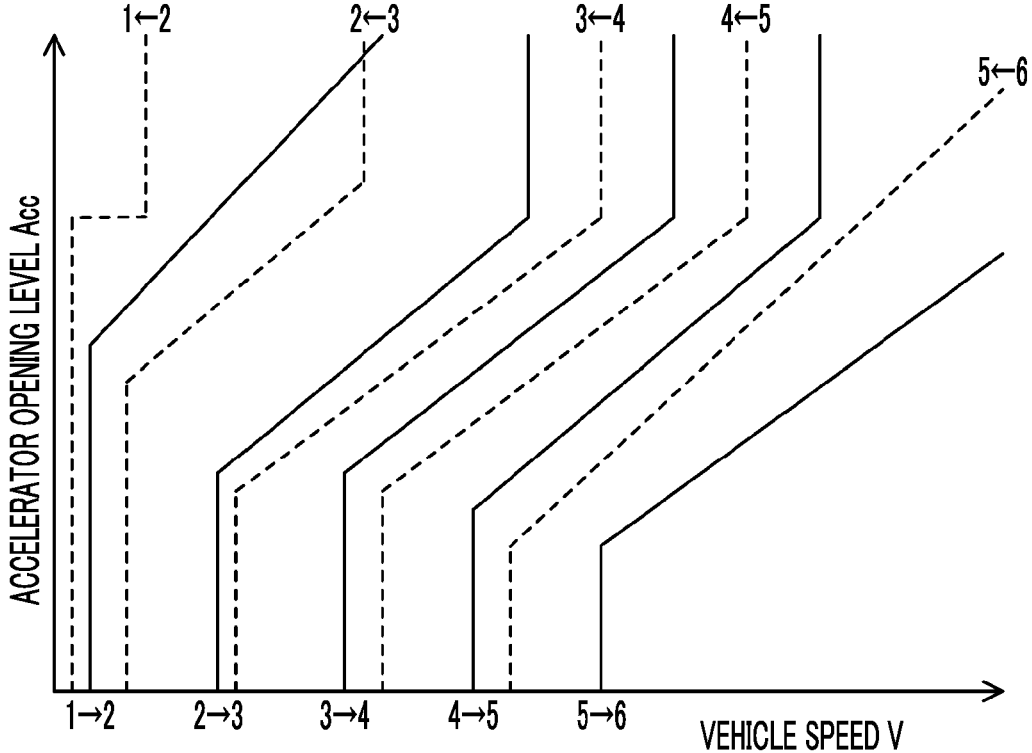
FIG. 7 is a diagram illustrating an example of a shift diagram of the hybrid vehicle.
Figure 8:
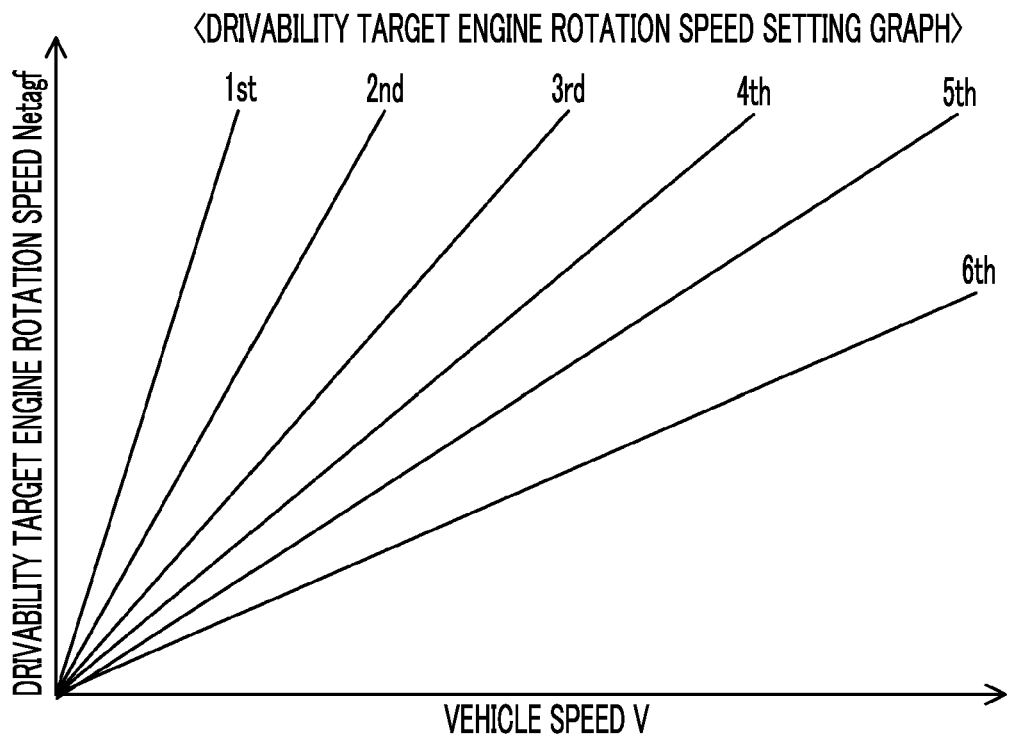
FIG. 8 is a diagram illustrating an example of a drivability target engine rotation speed setting graph in the first embodiment.

Subsequently, the shift stage M is set using the accelerator opening level Acc, the vehicle speed V, and the shift diagram (Step S120), and a drivability target engine rotation speed Netagf is set using the vehicle speed V, the shift stage M, and a drivability target engine rotation speed setting graph (Step S130). FIG. 7 illustrates an example of the shift diagram. In the drawing, a solid line denotes an upshift line, and a dotted line denotes a downshift line. In the first embodiment, since control is performed with the automatic gearshift of six virtual shift stages, the shift diagram also corresponds to six shift stages. FIG. 8 illustrates an example of the drivability target engine rotation speed setting graph. In the drivability target engine rotation speed setting graph of the first embodiment, the drivability target engine rotation speed Netagf is set in a linear relationship with the vehicle speed V for each shift stage such that a slope with respect to the vehicle speed V decreases as the shift stage increases. The reason for setting the drivability target engine rotation speed Netagf in this way is to give a driving feeling of a vehicle equipped with an automatic gearshift to the driver by increasing the rotation speed Ne of the engine 22 when the vehicle speed V increases for each shift stage, decreasing the rotation speed Ne of the engine 22 in upshifting, or increasing the rotation speed Ne of the engine 22 in downshifting.

Then, the upper-limit engine power Pelim is set using the drivability target engine rotation speed Netagf and an upper-limit engine power setting graph (Step S140). When the upper-limit engine power Pelim is set, an upper-limit driving force Tdlim is set by dividing the upper-limit engine power Pelim by the rotation speed Nd of the drive shaft 36 (Step S150). As the rotation speed Nd of the drive shaft 36, a rotation speed obtained by multiplying the rotation speed Nm2 of the second motor MG2 by the conversion factor km or a rotation speed obtained by multiplying the vehicle speed V by the conversion factor Kv can be used as described above.

The accelerator required driving force Tda and the upper-limit driving force Tdlim are compared (Step S160). When the accelerator required driving force Tda is equal to or less than the upper-limit driving force Tdlim, the accelerator required driving force Tda is set as the base driving force Tdb (Step S170), and a result obtained by multiplying the accelerator required driving force Tda by the rotation speed Nd of the drive shaft 36 is set as the target engine power Pe* (Step S180). Accordingly, the target engine power Pe* can be said to be power for outputting the accelerator required driving force Tda to the drive shaft 36.

On the other hand, when the accelerator required driving force Tda is greater than the upper-limit driving force Tdlim, the upper-limit driving force Tdlim is set as the base driving force Tdb (Step S190) and the upper-limit engine power Pelim is set as the target engine power Pe* (Step S200).

Since the upper-limit driving force Tdlim is calculated by dividing the upper-limit engine power Pelim by the rotation speed Nd of the drive shaft 36 in Step S150, the upper-limit engine power Pelim can be said to be power for outputting the upper-limit driving force Tdlim to the drive shaft 36.

Then, the drivability target engine rotation speed Netagf is set as the target engine rotation speed Ne* (Step S210) and the torque command Tm1* of the first motor MG1 is set using Expression (2) (Step S220). By setting a drivability target engine rotation speed Netagf as the target engine rotation speed Ne*, it is possible to operate the engine 22 at the rotation speed corresponding to the shift stage M and to give a good driving feeling to the driver.

Figure 10:
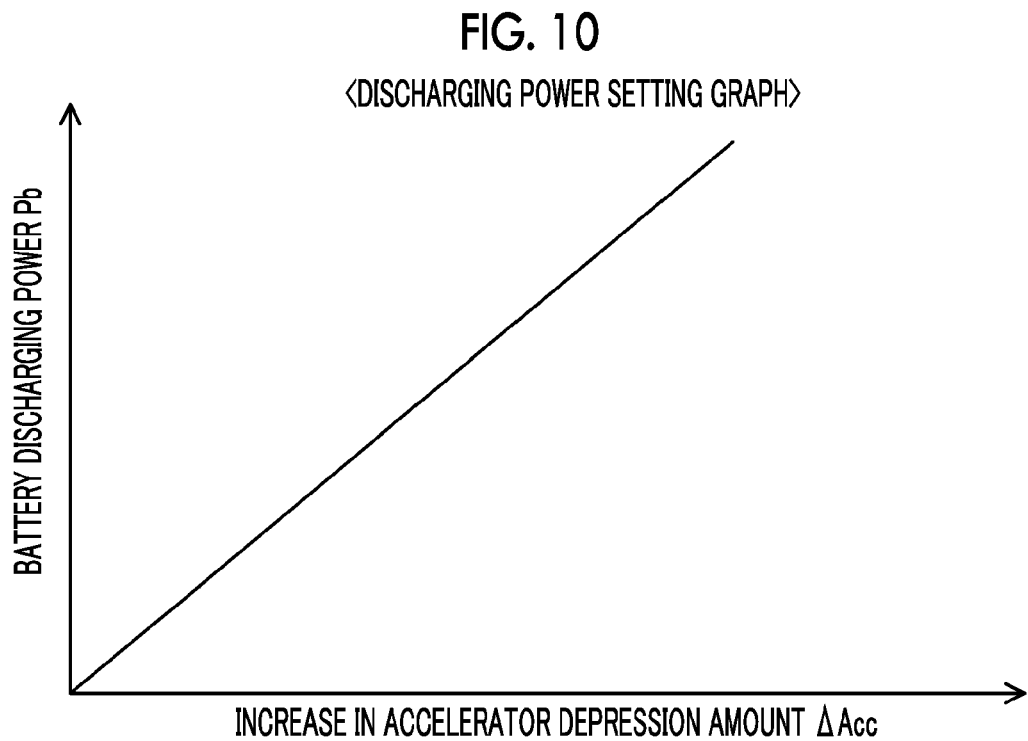
FIG. 10 is a diagram illustrating an example of an accelerator depression increasing discharging power setting graph when the accelerator depression amount increases.

Then, an increase in accelerator depression amount ΔAcc is calculated by subtracting a previous value (previous Acc) from a current value of the accelerator opening level Acc (Step S230), a duration time (a depression increasing time) t after an increase in the depression amount of the accelerator pedal 83 is started is measured (Step S240), and it is determined whether the accelerator depression increasing time t is less than a threshold value tref (Step S250). Here, the threshold value tref is an upper-limit time in which addition control of adding the correction driving force Tdc to the base driving force Tdb with an increase in the depression amount of the accelerator pedal 83 and can be determined to be, for example, one second. When the accelerator depression increasing time t is less than the threshold value tref, a battery discharging power Pb is set using the increase in accelerator depression amount ΔAcc and the discharging power setting graph (Step S260) and a value obtained by dividing the battery discharging power Pb by the rotation speed Nd of the drive shaft 36 is set as a temporary correction driving force Tdctmp which is a temporary value of the correction driving force Tdc (Step S270). FIG. 10 illustrates an example of an accelerator depression increasing discharging power setting graph. The accelerator depression increasing discharging power setting graph is set such that a discharging power (a power with a positive value) increases as the increase in accelerator depression amount ΔAcc increases. Accordingly, as the increase in accelerator depression amount ΔAcc increases, the temporary correction driving force Tdctmp increases.

Reflection ratios ka, kb, kc, kd, and ke in a range of values 0 to 1.0 are set using reflection ratio setting graphs corresponding to the accelerator depression increasing time t, the accelerator opening level Acc, the vehicle speed V, the power storage ratio SOC, and the battery temperature Tb (Step S280), respectively, and values obtained by multiplying the temporary correction driving force Tdctmp by the reflection ratios ka, kb, kc, kd, and ke are set as the correction driving force Tdc (Step S290).

Figure 11:
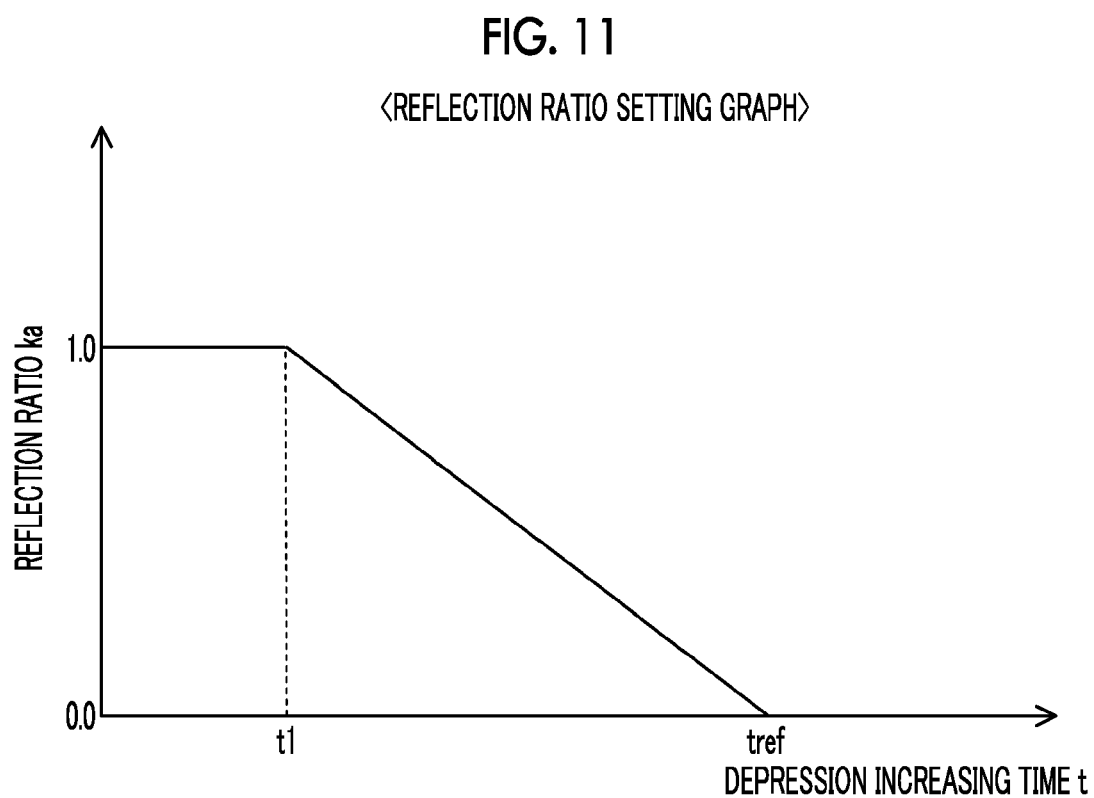
FIG. 11 is a diagram illustrating an example of a reflection ratio setting graph corresponding to an accelerator depression increasing time in the first embodiment.
Figure 12:
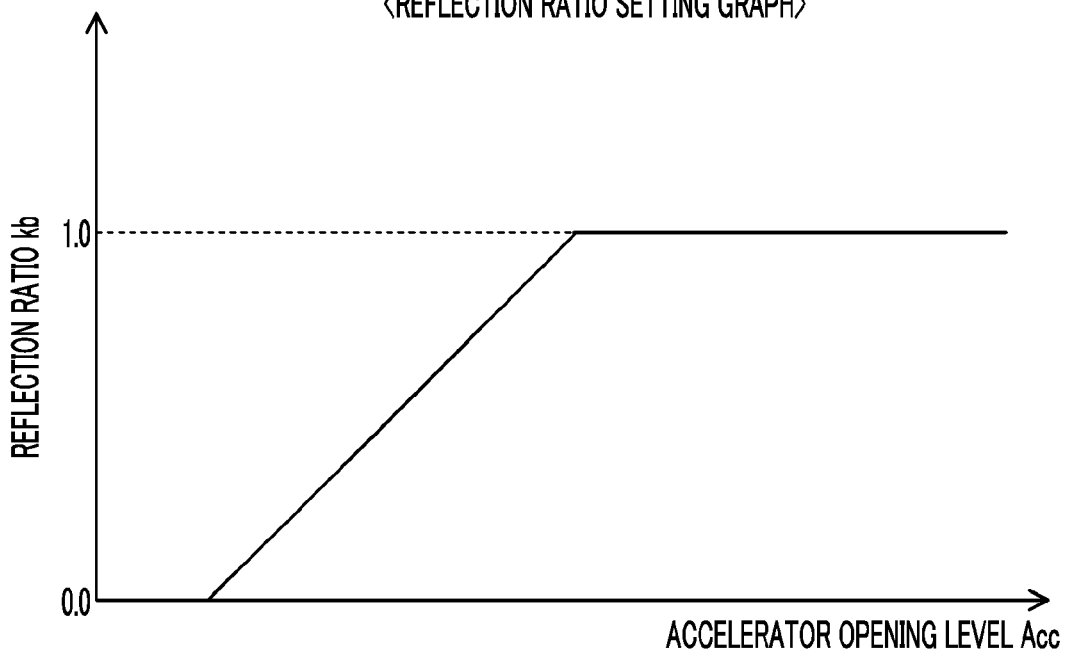
FIG. 12 is a diagram illustrating an example of a reflection ratio setting graph corresponding to an accelerator opening level of the hybrid vehicle.
Figure 13:
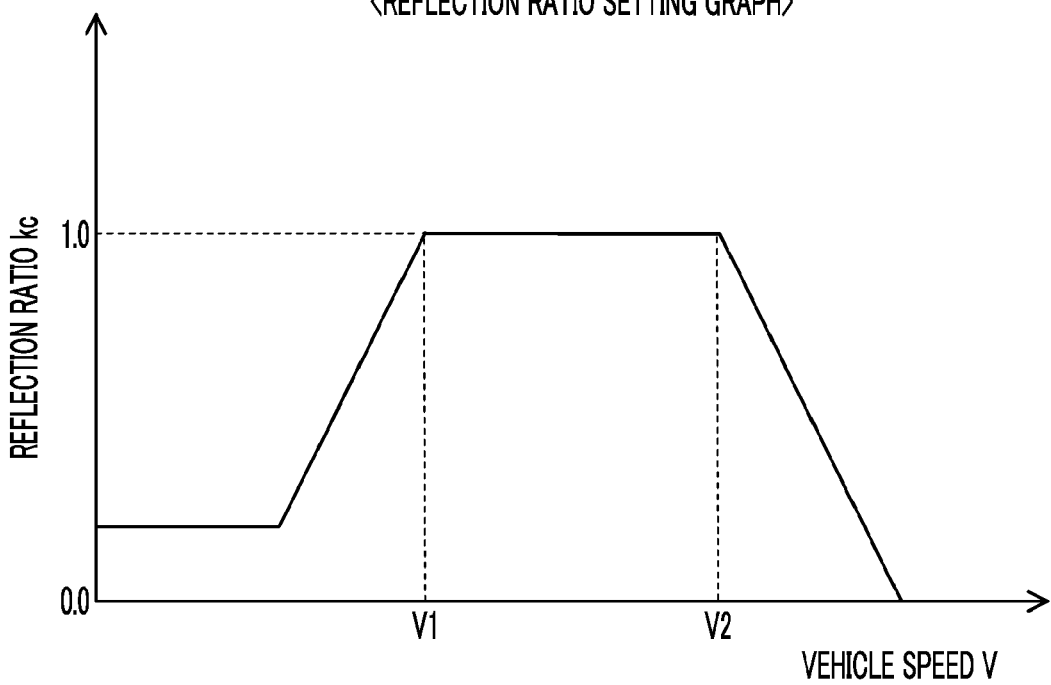
FIG. 13 is a diagram illustrating an example of a reflection ratio setting graph corresponding to vehicle speed in the first embodiment.
Figure 14:
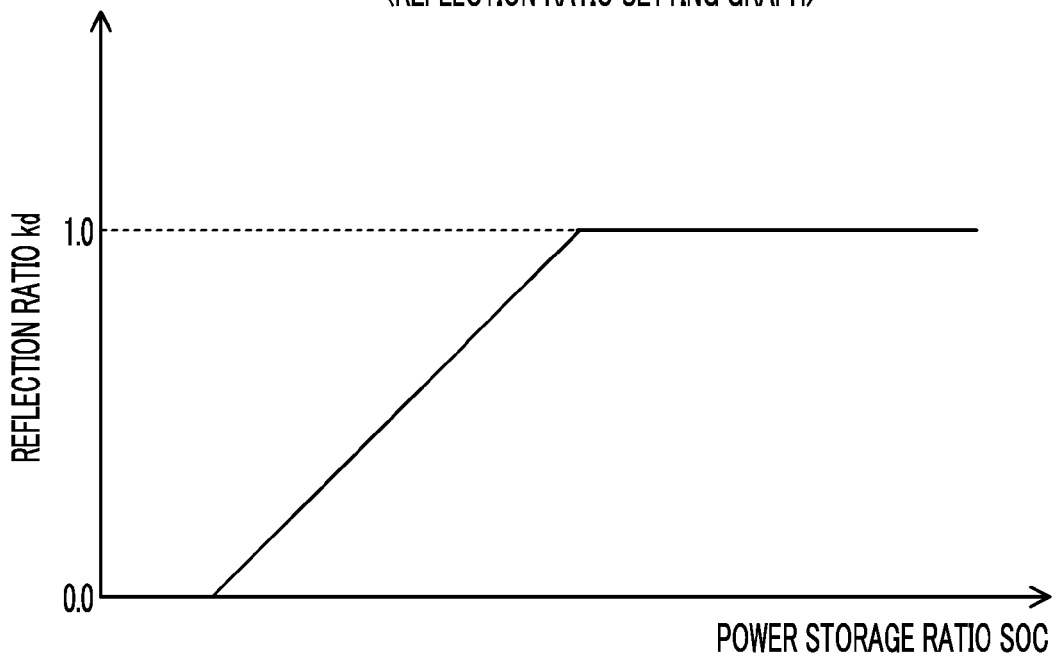
FIG. 14 is a diagram illustrating an example of a reflection ratio setting graph corresponding to a power storage ratio (SOC) in the first embodiment.
Figure 15:
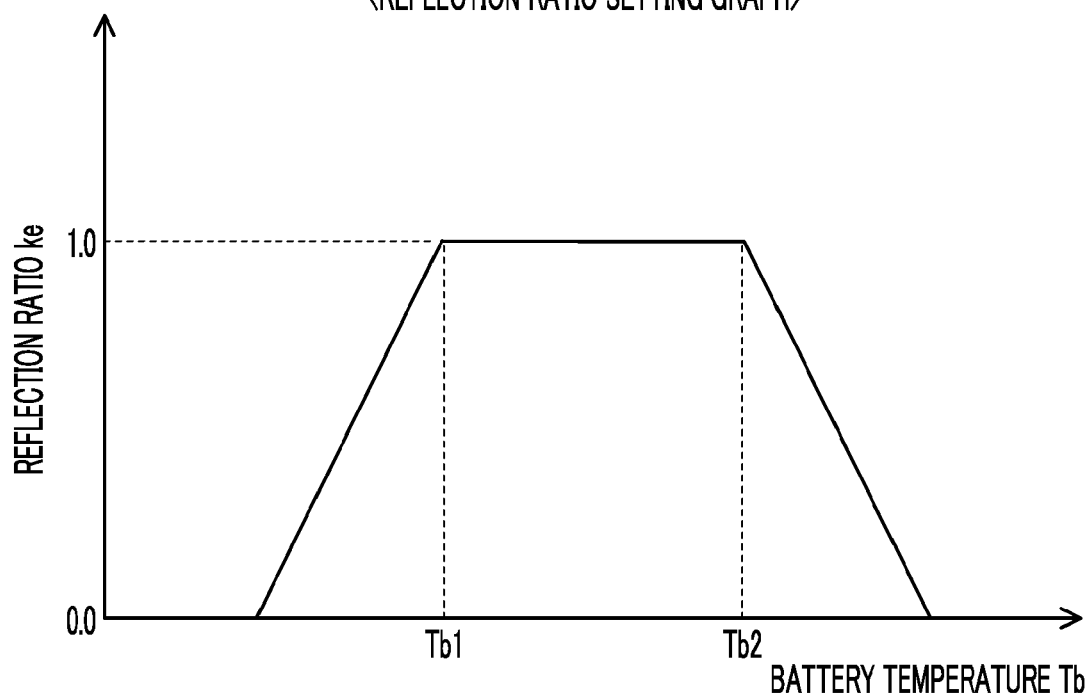
FIG. 15 is a diagram illustrating an example of a reflection ratio setting graph corresponding to a battery temperature in the first embodiment.

FIG. 11 illustrates an example of a reflection ratio setting graph corresponding to the accelerator depression increasing time t, FIG. 12 illustrates an example of a reflection ratio setting graph corresponding to the accelerator opening level Acc, FIG. 13 illustrates an example of a reflection ratio setting graph corresponding to the vehicle speed V, FIG. 14 illustrates an example of a reflection ratio setting graph corresponding to power storage ratio SOC, and FIG. 15 illustrates an example of a reflection ratio setting graph corresponding to the battery temperature Tb. In the reflection ratio setting graph corresponding to the accelerator depression increasing time t, the reflection ratio is set to a value of 1.0 until the accelerator depression increasing time t reaches time t1, is set to approach a value of 0 as the accelerator depression increasing time t increases when the accelerator depression increasing time t is greater than time t1, and is set to a value of 0 when the accelerator depression increasing time t reaches the above-mentioned threshold value tref. Accordingly, since the correction driving force Tdc gradually decreases to a value of 0 as the accelerator depression increasing time t increases, it is possible to prevent the battery 50 from continuously discharging large power over a long time. In the reflection ratio setting graph corresponding to the accelerator opening level Acc, the reflection ratio is set to decrease as the accelerator opening level Acc decreases. Accordingly, when the increase in accelerator depression amount ΔAcc is large and the accelerator opening level Acc is low, the correction driving force Tdc does not increase much and it is thus possible to prevent the driving force output to the drive shaft 36 from increasing excessively when the accelerator opening level Acc is low. In the reflection ratio setting graph corresponding to the vehicle speed V, the reflection ratio is set to a value of 1 when the vehicle speed V is in a vehicle speed range which is equal to or higher than a vehicle speed V1 and equal to or lower than a vehicle speed V2 higher than the vehicle speed V1, and is set to decrease when the vehicle speed V is lower than the vehicle speed V1 or higher than the vehicle speed V2. The reason for setting the reflection ratio kc to decrease when the vehicle speed V increases is that the correction driving force Tdc is set to a value obtained by dividing the battery discharging power Pb by the rotation speed Nd of the drive shaft 36 and thus the correction driving force Tdc does not have a large value with respect to the battery discharging power Pb and a satisfactory effect cannot be achieved even by increasing the reflection ratio kc when the vehicle speed V is high. The reason for setting the reflection ratio kc to decrease when the vehicle speed V decreases is that the correction driving force Tdc can have a large value with respect to the battery discharging power Pb even by decreasing the reflection ratio kc when the vehicle speed V is low and thus the driving force output to the drive shaft 36 can be prevented from increasing excessively. In the reflection ratio setting graph corresponding to the power storage ratio SOC, the reflection ratio is set to decrease as the power storage ratio SOC decreases. In the reflection ratio setting graph corresponding to the battery temperature Tb, the reflection ratio is set to a value of 1 when the battery temperature Tb is in a temperature range which is equal to or higher than a temperature Tb1 and equal to or lower than a temperature Tb2 higher than the temperature Tb1 (in an appropriate temperature range), and is set to decrease when the battery temperature Tb is lower than the temperature Tb1 and higher than the temperature Tb2. These configurations are provided to protect the battery 50 by limiting discharging of the battery 50.

When the correction driving force Tdc is set in this way, the value obtained by adding the correction driving force Tdc to the base driving force Tdb is set as the effective driving force Td* (Step S300) and the torque command Tm2* of the second motor MG2 is set using Expression (3) (Step S310). Then, the target engine power Pe* and the target engine rotation speed Ne* are transmitted to the engine ECU 24, the torque commands Tm1* and Tm2* are transmitted to the motor ECU 40 (Step S320), and the routine ends.

On the other hand, when it is determined in Step S250 that the accelerator depression increasing time t is equal to or greater than the threshold value tref, the base driving force Tdb is set as the effective driving force Td* (Step S330), the torque command Tm2* of the second motor MG2 is set using Expression (3) (Step S340), the target engine power Pe* and the target engine rotation speed Ne* are transmitted to the engine ECU 24, the torque commands Tm1* and Tm2* are transmitted to the motor ECU 40 (Step S350), and the routine ends.

The accelerator depression increasing drivability priority drive control routine has been described above. When the depression amount of the accelerator pedal 83 does not increase or when the elapsed time after the depression amount of the accelerator pedal 83 increases (the accelerator depression increasing time t) is greater than the threshold value tref, the base driving force Tdb is set as the effective driving force Td* and the effective driving force Td* is controlled to be output to the drive shaft 36. At this time, the target engine power Pe* may be set as follows. In Step S150, the upper-limit driving force Tdlim is set by dividing a value, which is obtained by adding the charging/discharging required power Pb* to the upper-limit engine power Pelim, by the rotation speed Nd of the drive shaft 36 in Step S150, and the accelerator required driving force Tda and the upper-limit driving force Tdlim are compared with each other (Step S160). When the accelerator required driving force Tda is equal to or less than the upper-limit driving force Tdlim, a value obtained by subtracting the charging/discharging required power Pb* from a value which is obtained by multiplying the accelerator required driving force Tda by the rotation speed Nd of the drive shaft 36 is set as the target engine power Pe* in Step S180. On the other hand, when the accelerator required driving force Tda is greater than the upper-limit driving force Tdlim, the upper-limit engine power Pelim is set as the target engine power Pe* (Step S200).

In the above-mentioned hybrid vehicle 20 according to the first embodiment, when the depression amount of the accelerator pedal 83 increases in the driving feeling priority mode and at the D position, the shift stage M is set based on the accelerator opening level Acc and the vehicle speed V, and the drivability target engine rotation speed Netagf (the target engine rotation speed Ne*) is set based on the vehicle speed V and the shift stage M. The upper-limit engine power Pelim is set based on the drivability target engine rotation speed Netagf, and the upper-limit driving force Tdlim is set by dividing the upper-limit engine power Pelim by the rotation speed Nd of the drive shaft 36. When the accelerator required driving force Tda is equal to or less than the upper-limit driving force Tdlim, the accelerator required driving force Tda is set as the base driving force Tdb. When the accelerator required driving force Tda is greater than the upper-limit driving force Tdlim, the upper-limit driving force Tdlim is set as the base driving force Tdb. That is, the base driving force Tdb is set based on the accelerator required driving force Tda (the accelerator opening level Acc and the vehicle speed V) and the drivability target engine rotation speed Netagf. The correction driving force Tdc is set based on the increase in accelerator depression amount ΔAcc, and the engine 22, the first motor MG1, and the second motor MG2 are controlled such that the effective driving force Td* obtained by adding the correction driving force Tdc to the base driving force Tdb is output to the drive shaft 36 for the hybrid vehicle to travel. Accordingly, when a driver depresses on the accelerator pedal 83, it is possible to cause the engine 22 to rotate depending on the vehicle speed V and to give a better driving feeling to the driver in comparison with a case in which the rotation speed Ne of the engine 22 increases rapidly before the vehicle speed V increases. Since the driving force output to the drive shaft 36 is more greatly corrected as the increase in accelerator depression amount ΔAcc increases, it is possible to achieve an acceleration force (responsiveness) corresponding to a driver's request. As a result, it is possible to realize a good driving feeling and acceleration performance in response to an operation on the accelerator pedal.

In addition, in the hybrid vehicle 20 according to the first embodiment, when the accelerator required driving force Tda is equal to or less than the upper-limit driving force Tdlim, power for outputting the accelerator required driving force Tda to the drive shaft 36 is set as the target engine power Pe*. When the accelerator required driving force Tda is greater than upper-limit driving force Tdlim, the upper-limit engine power Pelim obtained from the drivability target engine rotation speed Netagf is set as the target engine power Pe*. On the other hand, the battery discharging power Pb is set based on the increase in accelerator depression amount ΔAcc, the correction driving force Tdc is set based on the temporary correction driving force Tdctmp obtained by dividing the battery discharging power Pb by the rotation speed Nd of the drive shaft 36, and the correction driving force Tdc is added to the base driving force Tdb. That is, regardless of the magnitude of the correction driving force Tdc, the same target engine power Pe* is set and the engine 22 operates as the same operating point. Accordingly, it is possible to prevent the rotation speed Ne of the engine 22 from increasing or decreasing from the rotation speed based on the vehicle speed V and the shift stage M (the drivability target engine rotation speed Netagf) due to the correction driving force Tdc.

In the hybrid vehicle 20 according to the first embodiment, the reflection ratio ka which gradually decreases from 1.0 to 0 with the lapse of time after the increase in the depression amount of the accelerator pedal 83 starts is set and the correction driving force Tdc is set based on the value obtained by multiplying the temporary correction driving force Tdctmp by the reflection ratio ka. Accordingly, it is possible to prevent the battery 50 from continuously discharging large power.

In the hybrid vehicle 20 according to the first embodiment, the reflection ratio kb is set to decrease as the accelerator opening level Acc when the depression amount of the accelerator pedal 83 increases decreases, and the correction driving force Tdc is set based on a value obtained by multiplying the temporary correction driving force Tdctmp by the reflection ratio kb. Accordingly, when the accelerator opening level Acc is low, it is possible to prevent the driving force output to the drive shaft 36 from increasing excessively.

In the hybrid vehicle 20 according to the first embodiment, the reflection ratio kc is set to decrease when the vehicle speed V is higher than the vehicle speed V2, and the correction driving force Tdc is set based on the value obtained by multiplying the temporary correction driving force Tdctmp by the reflection ratio kc. Accordingly, when the reflection ratio kc is set to be large but the correction driving force Tdc cannot have a satisfactorily large value with respect to the battery discharging power Pb, it is possible to suppress useless discharging of the battery 50 in consideration of the fuel efficiency. The reflection ratio kc is set to decrease when the vehicle speed V is lower than the vehicle speed V1. Accordingly, when the correction driving force Tdc can have a satisfactorily large value with respect to the battery discharging power Pb, it is possible to prevent the driving force output to the drive shaft 36 from increasing excessively in consideration of the fuel efficiency.

In the hybrid vehicle 20 according to the first embodiment, the drivability target engine rotation speed Netagf is set as the target engine rotation speed Ne* in all the shift stages M. However, the drivability target engine rotation speed Netagf may be set as the target engine rotation speed Ne* when the shift stage M is less than a threshold value Mref, and the smaller of a fuel efficiency optimal engine rotation speed Nefc for outputting the target engine power Pe* from the engine 22 to be optimal for fuel efficiency and the drivability target engine rotation speed Netagf may be set as the target engine rotation speed Ne* when the shift stage M is equal to or greater than the threshold value Mref. The smaller of the fuel efficiency optimal engine rotation speed Nefc for outputting the target engine power Pe* from the engine 22 to be optimal for fuel efficiency in all the shift stages M and the drivability target engine rotation speed Netagf may be set as the target engine rotation speed Ne*.

In the hybrid vehicle 20 according to the first embodiment, the mode switch 90 is provided and the accelerator depression increasing drivability priority drive control routine illustrated in FIGS. 2 and 3 is performed when the driving feeling priority mode is selected by the mode switch 90, but the accelerator depression increasing drivability priority drive control routine illustrated in FIGS. 2 and 3 may be performed as normal drive control without providing the mode switch 90.

Figure 16:
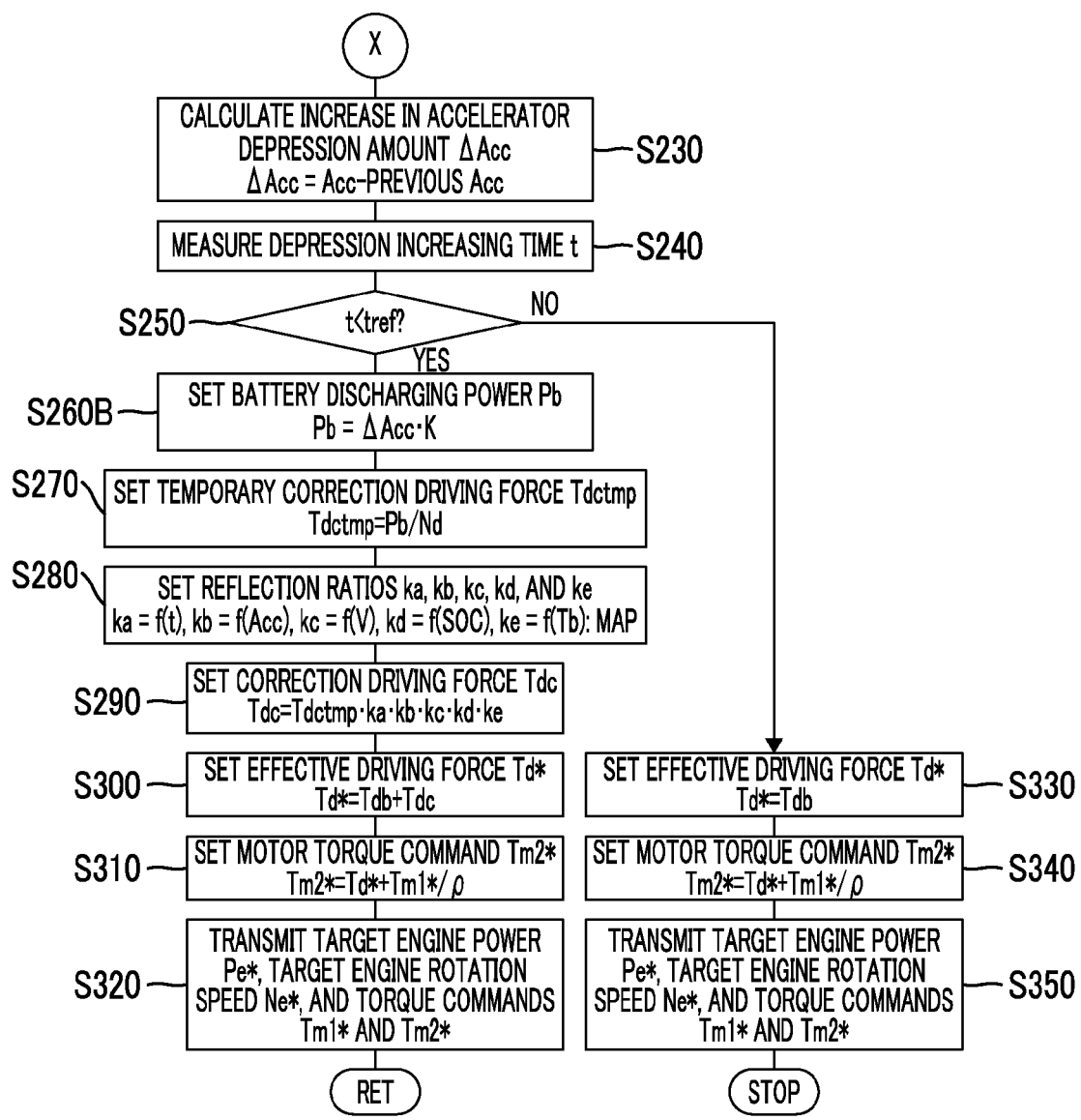
FIG. 16 is a flowchart illustrating an accelerator depression increasing drivability priority drive control routine (a second half) according to a modified example of the first embodiment.

In the hybrid vehicle 20 according to the first embodiment, the battery discharging power Pb is set based on the increase in accelerator depression amount ΔAcc and a value obtained by dividing the battery discharging power Pb by the rotation speed Nd of the drive shaft 36 is set as the temporary correction driving force Tdctmp. However, as described in the accelerator depression increasing drivability priority drive control routine illustrated in FIG. 16, the battery discharging power Pb may be set to a value obtained by multiplying the increase in accelerator depression amount ΔAcc by a coefficient K (Step S260B). As illustrated in FIG. 10, since the battery discharging power Pb has a linear relationship with the increase in accelerator depression amount ΔAcc, the same battery discharging power Pb as in Step S260 of the accelerator depression increasing drivability priority drive control routine illustrated in FIG. 2 can be set by determining a ratio of a slope with respect to the increase in accelerator depression amount ΔAcc as the coefficient K.

In the hybrid vehicle 20 according to the first embodiment, the value obtained by multiplying the temporary correction driving force Tdctmp based on the increase in accelerator depression amount ΔAcc by the reflection ratio ka corresponding to the accelerator depression increasing time t, the reflection ratio kb corresponding to the accelerator opening level Acc, the reflection ratio kc corresponding to the vehicle speed V, the reflection ratio kd corresponding to the power storage ratio SOC, and the reflection ratio ke corresponding to the battery temperature Tb is set as the correction driving force Tdc. However, some of the reflection ratios ka, kb, kc, kd, and ke may not be reflected in setting the correction driving force Tdc.

Figure 17:
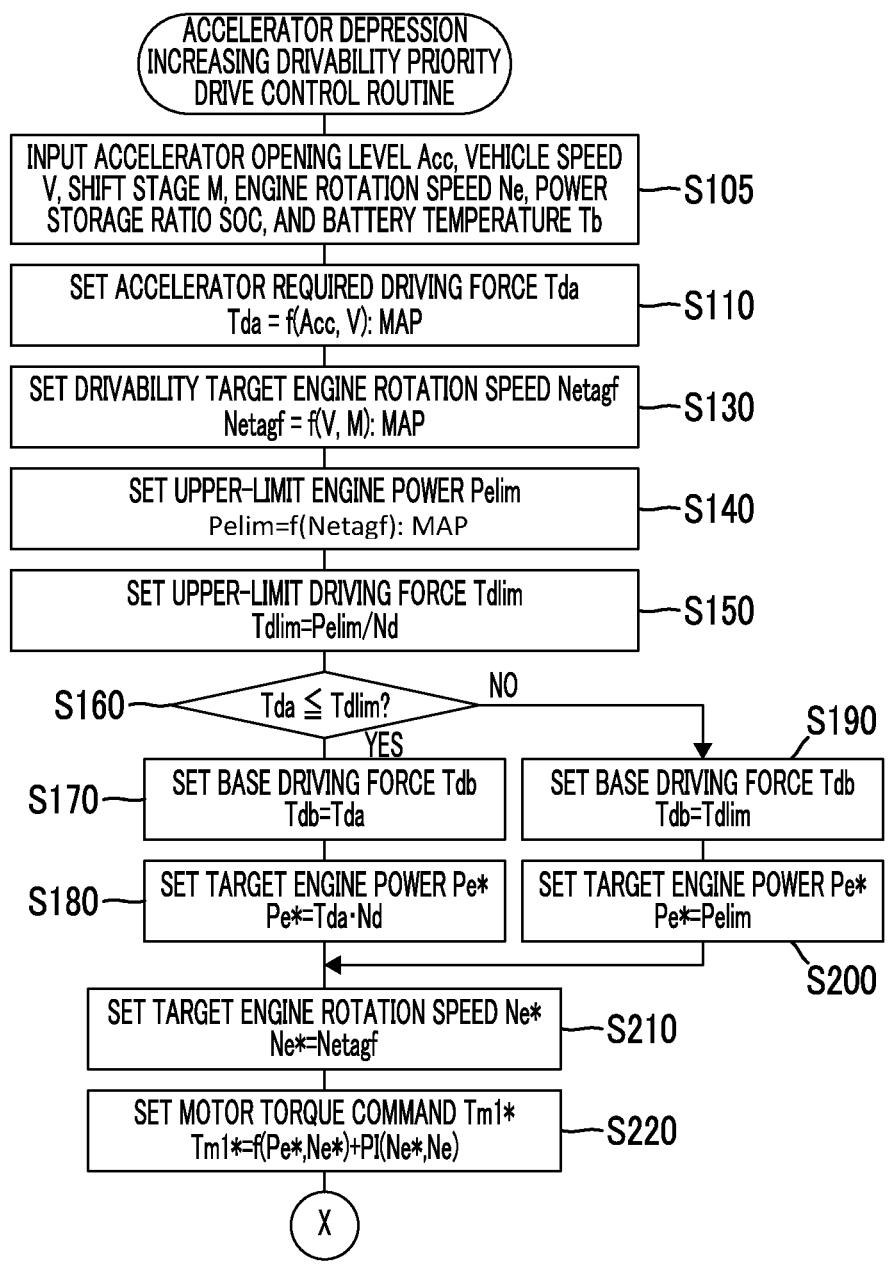
FIG. 17 is a flowchart illustrating an example of an accelerator depression increasing drivability priority drive control routine which is performed by the HVECU when the accelerator depression amount increases at an M position in the first embodiment.

An operation when the shift position SP is the manual position (M position) in the hybrid vehicle 20 according to the first embodiment will be described below. In this case, the accelerator depression increasing drivability priority drive control routine (a first half) illustrated in FIG. 17 and the accelerator depression increasing drivability priority drive control routine (a second half) illustrated in FIG. 3 can be performed. The accelerator depression increasing drivability priority drive control routine illustrated in FIG. 17 is the same as the accelerator depression increasing drivability priority drive control routine illustrated in FIG. 2, except that the process (Step S105) of inputting the shift stage M as the shift position SP is added and the process of Step S120 of setting the shift stage M using the shift diagram illustrated in FIG. 7 is excluded. The process of the second half of the accelerator depression increasing drivability priority drive control routine is the same as the accelerator depression increasing drivability priority drive control routine illustrated in FIG. 3 and thus is not illustrated. The drive control when the shift position SP is the manual position (M position) will be described below in brief using the accelerator depression increasing drivability priority drive control routine illustrated in FIG. 17.

Figure 4:
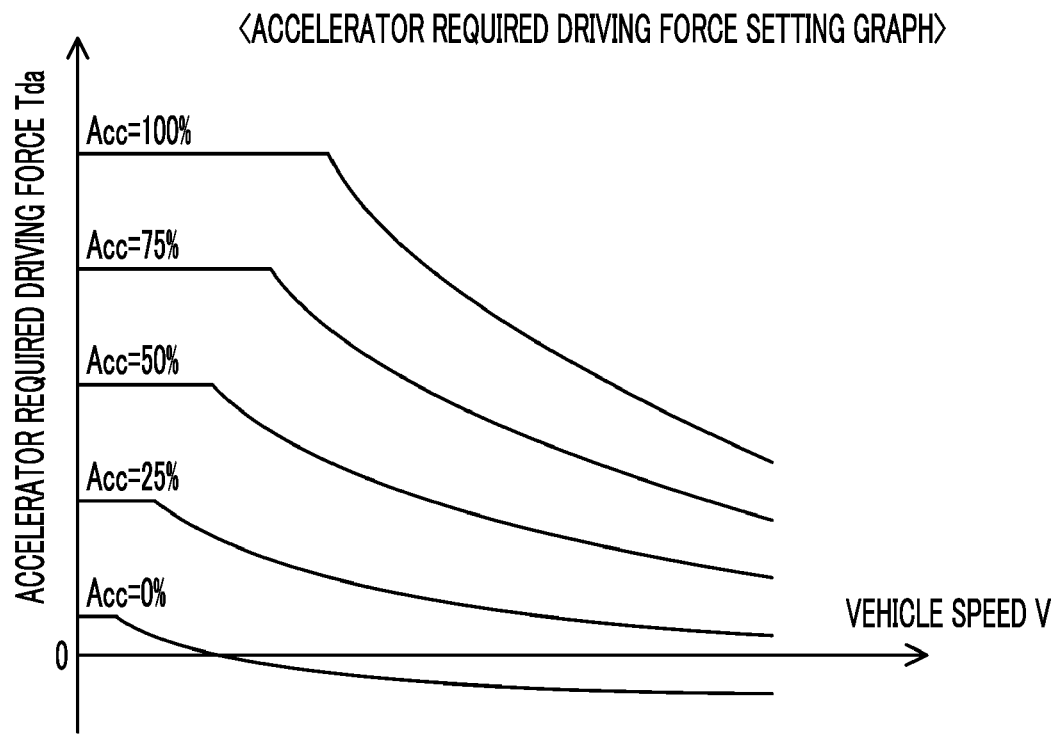
FIG. 4 is a diagram illustrating an example of an accelerator required driving force setting graph of the hybrid vehicle.
Figure 5:
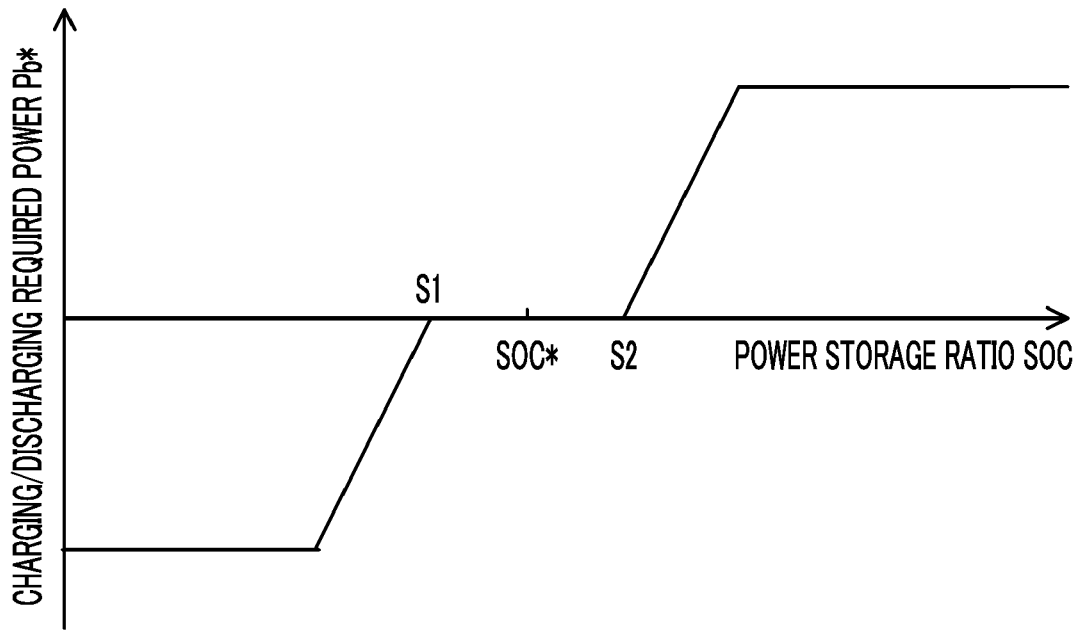
FIG. 5 is a diagram illustrating an example of a charging/discharging required power setting graph in the first embodiment.

When the accelerator depression increasing drivability priority drive control routine illustrated in FIG. 17 is performed, the HVECU 70 first receives the accelerator opening level Acc, the vehicle speed V, the shift stage M, the rotation speed Ne of the engine 22, the power storage ratio SOC of the battery 50, and the battery temperature Tb (Step S105), and sets the accelerator required driving force Tda using the accelerator opening level Acc, the vehicle speed V, and the accelerator required driving force setting graph illustrated in FIG. 4 (Step S110). Subsequently, the drivability target engine rotation speed Netagf is set using the vehicle speed V, the shift stage M, and the drivability target engine rotation speed setting graph illustrated in FIG. 8 (Step S130), and the upper-limit engine power Pelim is set using the drivability target engine rotation speed Netagf and the upper-limit engine power setting graph illustrated in FIG. 9 (Step S140). Then, the upper-limit driving force Tdlim is set by dividing the upper-limit engine power Pelim by the rotation speed Nd of the drive shaft 36 (Step S150) and the accelerator required driving force Tda and the upper-limit driving force Tdlim are compared (Step S160).

When the accelerator required driving force Tda is equal to or less than the upper-limit driving force Tdlim, the accelerator required driving force Tda is set as the base driving force Tdb (Step S170), and a value obtained by multiplying the accelerator required driving force Tda by the rotation speed Nd of the drive shaft 36 as set as the target engine power Pe* (Step S180). When the accelerator required driving force Tda is greater than the upper-limit driving force Tdlim, the upper-limit driving force Tdlim is set as the base driving force Tdb (Step S190) and the upper-limit engine power Pelim is set as the target engine power Pe* (Step S200).

The drivability target engine rotation speed Netagf is set as the target engine rotation speed Ne* (Step S210), and the torque command Tm1* of the first motor MG1 is set using Expression (2) (Step S220). The subsequent processes are the same as the processes of the accelerator depression increasing drivability priority drive control routine (a second half) illustrated in FIG. 3. That is, the increase in accelerator depression amount ΔAcc is calculated (Step S230) and the accelerator depression increasing time t is measured (Step S240). Subsequently, when the accelerator depression increasing time t is less than the threshold value tref (Step S250), the correction driving force Tdc is set by multiplying the temporary correction driving force Tdctmp obtained using the increase in accelerator depression amount ΔAcc and the discharging power setting graph illustrated in FIG. 10 by the reflection ratios ka, kb, kc, kd, and ke (Steps S260 to S290), and a value obtained by adding the correction driving force Tdc to the base driving force Tdb is set as the effective driving force Td* (Step S300). Then, the torque command Tm2* of the second motor MG2 is set using Expression (3) (Step S310), the target engine power Pe* and the target engine rotation speed Ne* are transmitted to the engine ECU 24, the torque commands Tm1* and Tm2* are transmitted to the motor ECU 40 (Step S320), and the routine ends. On the other hand, when the accelerator depression increasing time t is equal to or greater than the threshold value tref (Step S250), the base driving force Tdb is set as the effective driving force Td* (Step S330). The torque command Tm2* of the second motor MG2 is set using Expression (3) (Step S340), the target engine power Pe* and the target engine rotation speed Ne* are transmitted to the engine ECU 24, the torque commands Tm1* and Tm2* are transmitted to the motor ECU 40 (Step S350), and the routine ends.

In the hybrid vehicle 20 according to the first embodiment, when the shift position SP is the manual position (M position), the drivability target engine rotation speed Netagf is set based on the shift stage M and the vehicle speed V based on a driver's shifting operation (upshift or downshift). Accordingly, similarly to when the shift position SP is the D position, when a driver depresses on the accelerator pedal 83, it is possible to cause the engine 22 to rotate depending on the vehicle speed V and to give a better driving feeling to the driver in comparison with a case in which the rotation speed Ne of the engine 22 increases rapidly before the vehicle speed V increases. Since the driving force output to the drive shaft 36 is more greatly corrected as the increase in accelerator depression amount ΔAcc increases, it is possible to obtain an acceleration force (responsiveness) corresponding to a driver's request.

Figure 18:
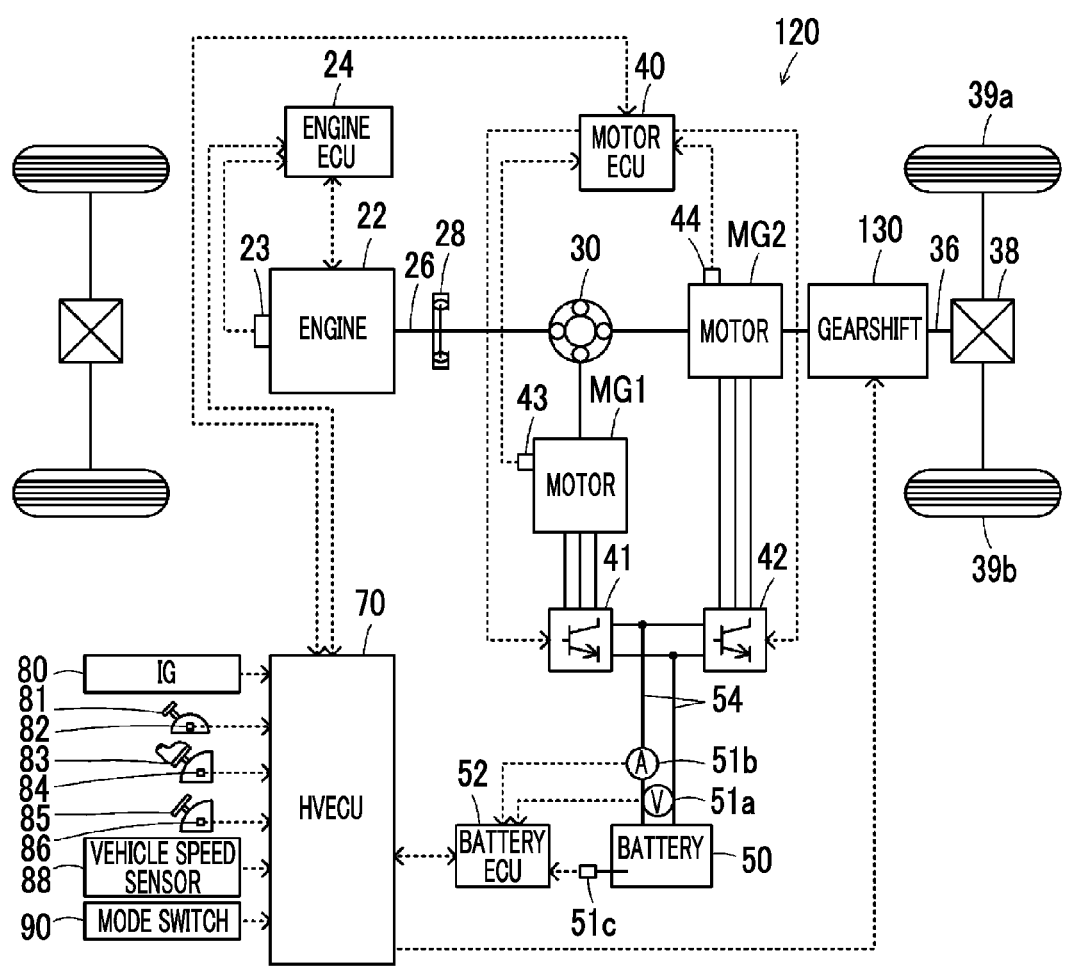
FIG. 18 is a diagram schematically illustrating a configuration of a hybrid vehicle according to a second embodiment.

A hybrid vehicle 120 according to a second embodiment of the disclosure will be described below. The configuration of the hybrid vehicle 120 according to the second embodiment is schematically illustrated in FIG. 18. The hybrid vehicle 120 according to the second embodiment has the same configuration as the hybrid vehicle 20 according to the first embodiment illustrated in FIG. 1, except that a gearshift 130 is provided as illustrated in FIG. 18. For the purpose of omission of repeated description, the same elements in the hybrid vehicle 120 according to the second embodiment as in the hybrid vehicle 20 according to the first embodiment will be referenced by the same reference signs and detailed description thereof will not be made.

Figure 19:
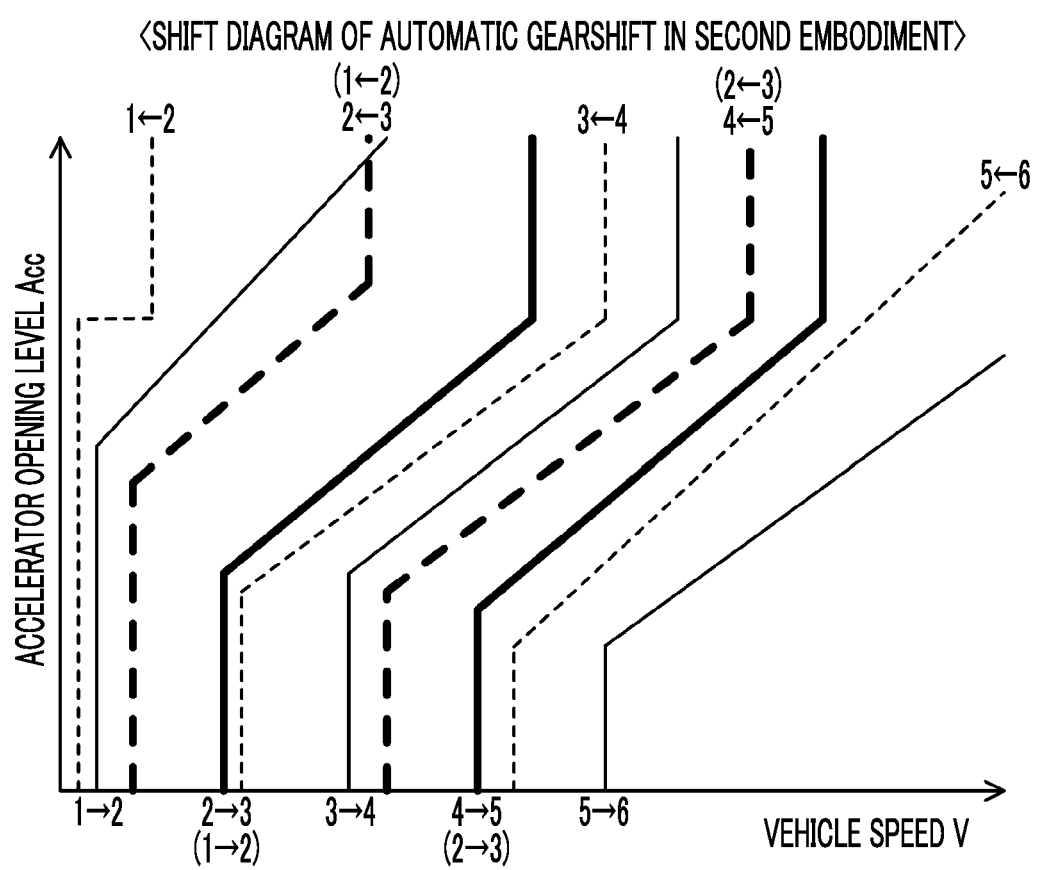
FIG. 19 is a diagram illustrating an example of a shift diagram of the hybrid vehicle which is used in the second embodiment.

The gearshift 130 included in the hybrid vehicle 120 according to the second embodiment is constituted by a stepped automatic gearshift of three shift stages in the driving direction which is hydraulically driven, and is shifted in accordance with a control signal from the HVECU 70. In the hybrid vehicle 120 according to the second embodiment, three virtual shift stages are set in addition to three shift stages of the gearshift 130 to constitute a gearshift of six shift stages. FIG. 19 illustrates an example of a shift diagram which is used in the second embodiment. For the purpose of easy comparison, the shift diagram illustrated in FIG. 19 is the same as the shift diagram illustrated in FIG. 7. In FIG. 19, thick solid lines denote upshift lines of the gearshift 130 and thick dotted lines denote downshift lines of the gearshift 130. Thin solid lines denote virtual upshift lines and thin dotted lines denote virtual downshift lines. In the drawing, numerals and arrows in the upper part and the lower part denote shift of six shift stages including the virtual shift stages, and numerals and arrows in parentheses in the upper part and the lower part denote shift of three shift stages of the gearshift 130. As illustrated in the drawing, one virtual shift stage is disposed between neighboring shift stages of the gearshift 130.

Figure 20:
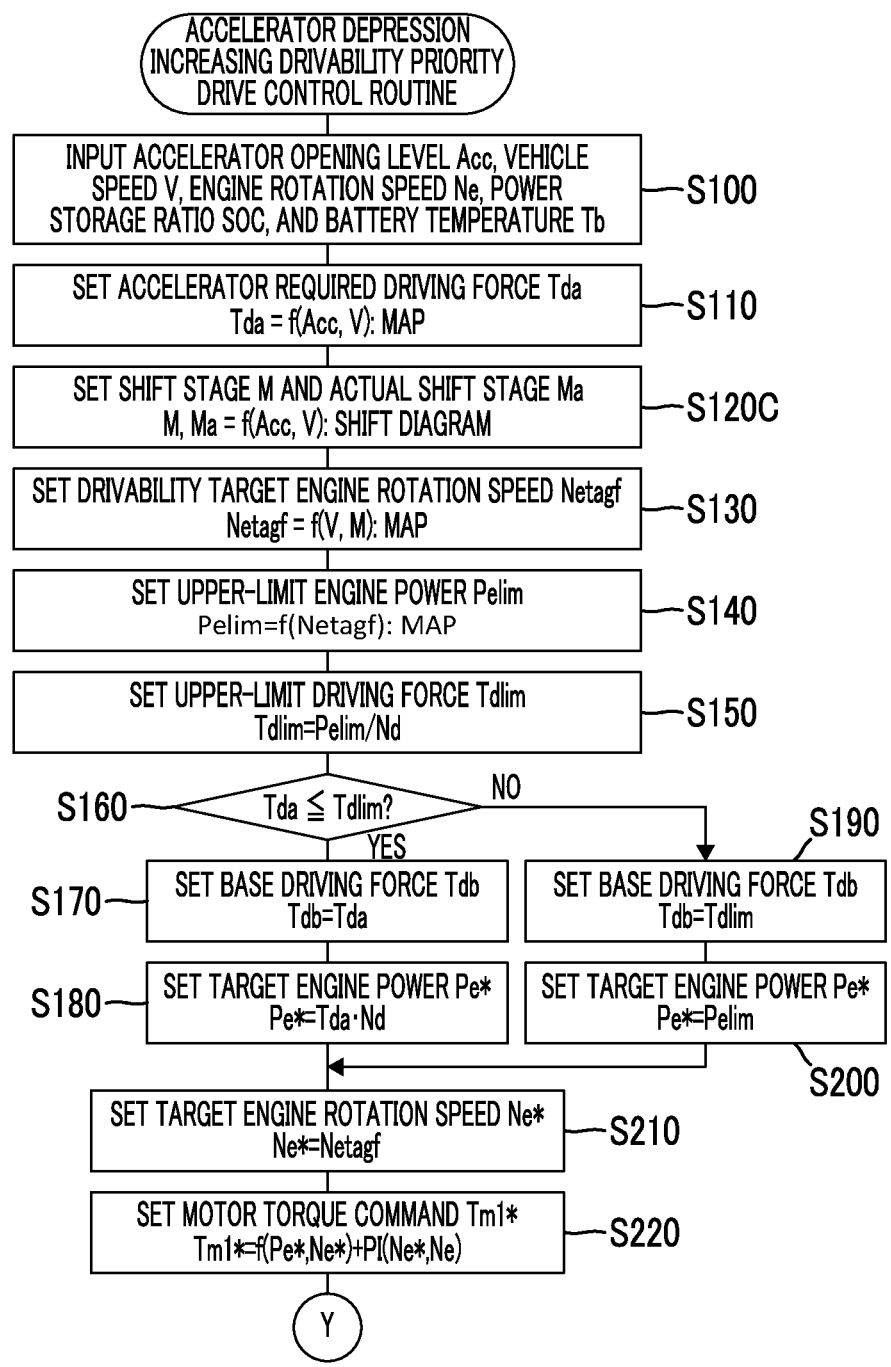
FIG. 20 is a flowchart illustrating an example of an accelerator depression increasing drivability priority drive control routine (a first half) according to the second embodiment which is performed by the HVECU when an accelerator depression amount increases in a driving feeling priority mode and at a D position in the second embodiment.
Figure 21:
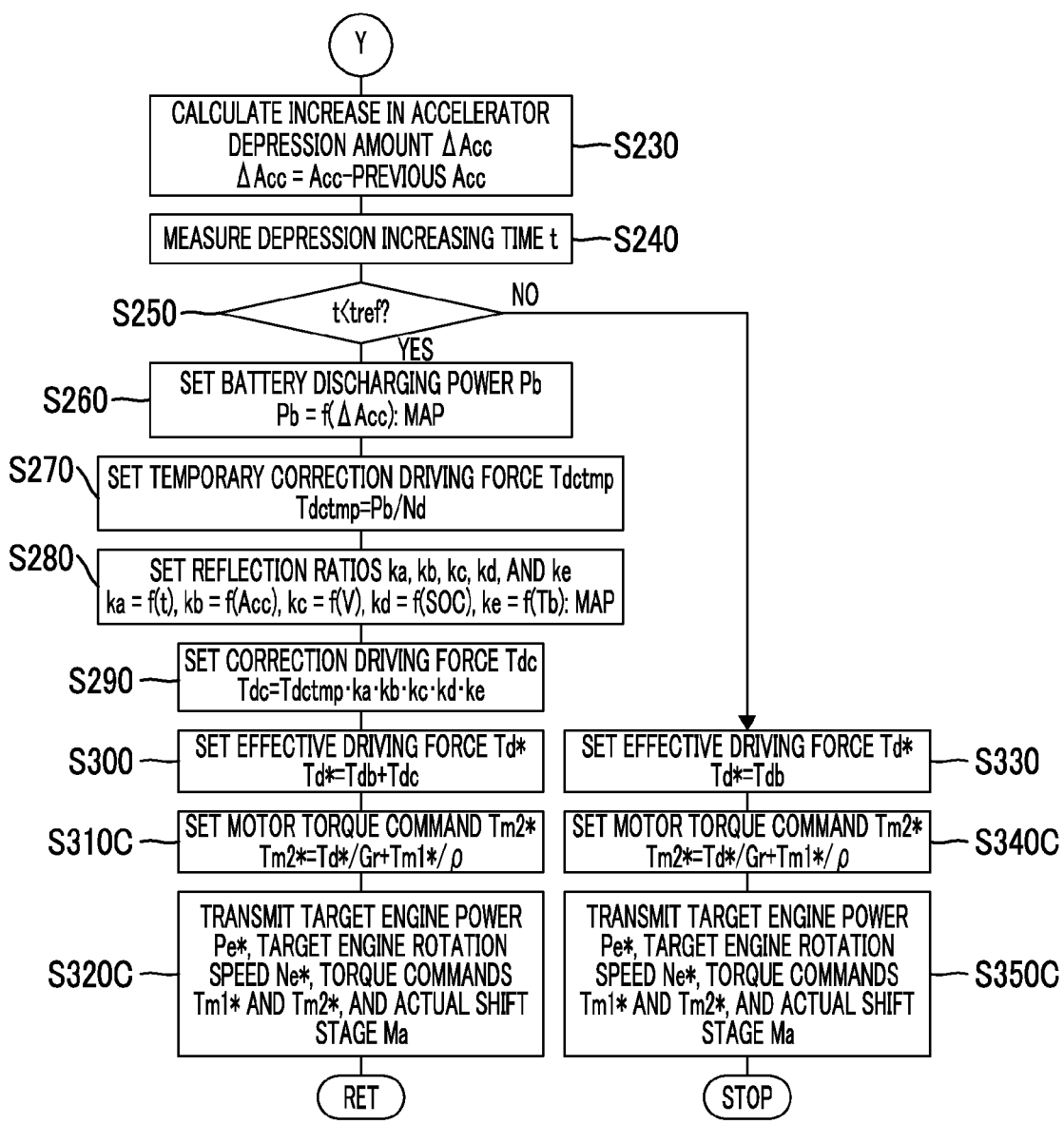
FIG. 21 is a flowchart illustrating an example of the accelerator depression increasing drivability priority drive control routine (a second half) according to the second embodiment.

In the hybrid vehicle 120 according to the second embodiment, when the shift position is the D position in the driving feeling priority mode, the accelerator depression increasing drivability priority drive control routine illustrated in FIGS. 20 and 21 are performed. The accelerator depression increasing drivability priority drive control routine illustrated in FIGS. 20 and 21 is the same as the accelerator depression increasing drivability priority drive control routine illustrated in FIGS. 2 and 3, except for Step S120C of setting an actual shift stage Ma as well as the shift stage M, Steps S310C and S340C of setting the torque command Tm2* of the second motor MG2 using a gear ratio Gr of the actual shift stages Ma of the gearshift 130, and Steps S320C and S350C of transmitting the actual shift stage Ma to the gearshift 130 when transmitting the target engine power Pe* or the target engine rotation speed Ne*. Accordingly, the same processes in the accelerator depression increasing drivability priority drive control routine illustrated in FIGS. 20 and 21 as in the accelerator depression increasing drivability priority drive control routine illustrated in FIGS. 2 and 3 are referenced by the same step numbers. The accelerator depression increasing drivability priority drive control routine illustrated in FIGS. 20 and 21 will be described below in brief with a focus on differences from the accelerator depression increasing drivability priority drive control routine illustrated in FIGS. 2 and 3.

When the accelerator depression increasing drivability priority drive control routine illustrated in FIGS. 20 and 21 is performed, the HVECU 70 first receives the accelerator opening level Acc, the vehicle speed V, the rotation speed Ne of the engine 22, the power storage ratio SOC of the battery 50, and the battery temperature Tb (Step S100), and sets the accelerator required driving force Tda using the accelerator opening level Acc, the vehicle speed V, and the accelerator required driving force setting graph illustrated in FIG. 4 (Step S110). Subsequently, the shift stage M and the actual shift stage Ma are set using the accelerator opening level Acc, the vehicle speed V, and the shift diagram illustrated in FIG. 19 (Step S120C). Here, the shift stage M means the six shift stages including the virtual shift stages, and the actual shift stage Ma means the three shift stages of the gearshift 130. Accordingly, the shift stage M is set to correspond to any one of the six shift stages based on all shift stage lines in FIG. 19, and the actual shift stage Ma is set to correspond to any one of the three shift stages based on the thick solid line and the thick dotted line in FIG. 19.

Figure 9:
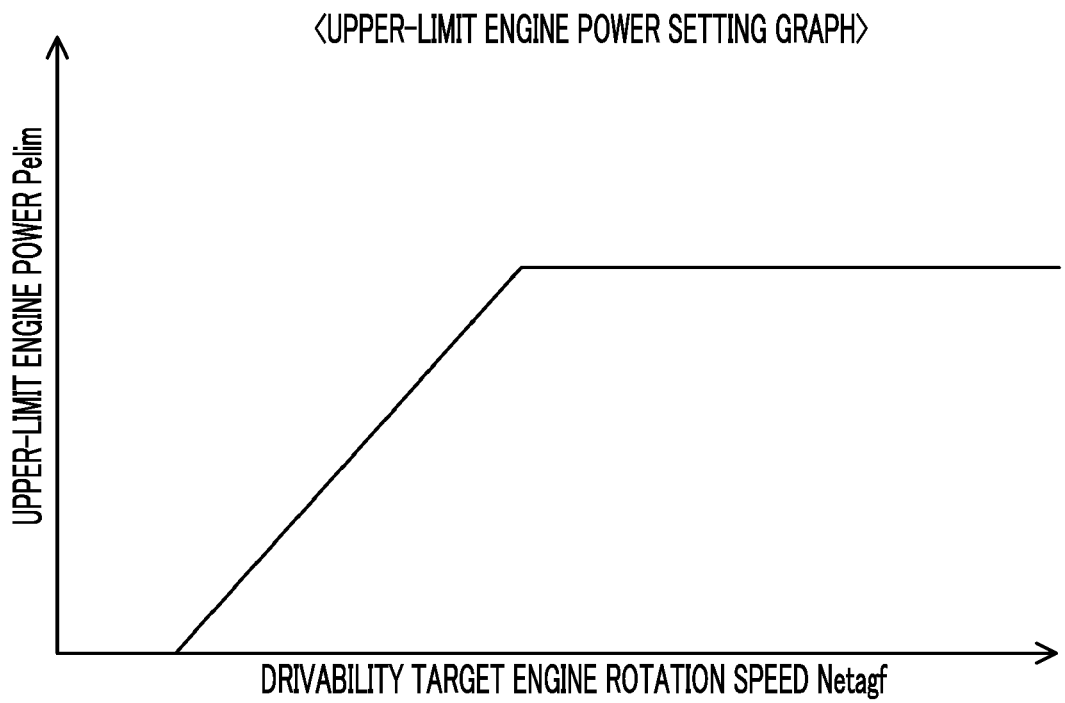
FIG. 9 is a diagram illustrating an example of an upper-limit engine power setting graph in the first embodiment.

Then, the drivability target engine rotation speed Netagf is set using the vehicle speed V, the shift stage M, and the drivability target engine rotation speed setting graph illustrated in FIG. 8 (Step S130), and the upper-limit engine power Pelim is set using the drivability target engine rotation speed Netagf and the upper-limit engine power setting graph illustrated in FIG. 9 (Step S140). Then, the upper-limit driving force Tdlim is set by dividing the upper-limit engine power Pelim by the rotation speed Nd of the drive shaft 36 (Step S150) and the accelerator required driving force Tda and the upper-limit driving force Tdlim are compared (Step S160).

When the accelerator required driving force Tda is equal to or less than the upper-limit driving force Tdlim, the accelerator required driving force Tda is set as the base driving force Tdb (Step S170), and a value obtained by multiplying the accelerator required driving force Tda by the rotation speed Nd of the drive shaft 36 as set as the target engine power Pe* (Step S180). When the accelerator required driving force Tda is greater than the upper-limit driving force Tdlim, the upper-limit driving force Tdlim is set as the base driving force Tdb (Step S190) and the upper-limit engine power Pelim is set as the target engine power Pe* (Step S200).

The drivability target engine rotation speed Netagf is set as the target engine rotation speed Ne* (Step S210), and the torque command Tm1* of the first motor MG1 is set using Expression (2) (Step S220). Then, the increase in accelerator depression amount ΔAcc is calculated (Step S230) and the accelerator depression increasing time t is measured (Step S240). Subsequently, when the accelerator depression increasing time t is less than the threshold value tref (Step S250), the correction driving force Tdc is set by multiplying the temporary correction driving force Tdctmp obtained using the increase in accelerator depression amount ΔAcc and the discharging power setting graph illustrated in FIG. 10 by the reflection ratios ka, kb, kc, kd, and ke (Steps S260 to S290), and a value obtained by adding the correction driving force Tdc to the base driving force Tdb is set as the effective driving force Td* (Step S300).

Then, the torque command Tm2* of the second motor MG2 is set using Expression (5) (Step S310C). In Expression (5), "Gr" denotes a gear ratio of the actual shift stage Ma of the gearshift 130. Accordingly, the first term on the right side of Expression (5) means a driving force to be output to an input shaft of the gearshift 130 so as to output the effective driving force Td* to the drive shaft 36 which is an output shaft of the gearshift 130.

$$Tm2^*=Td^*/Gr+Tm1^*/\rho \quad (5)$$

The target engine power Pe* and the target engine rotation speed Ne* are transmitted to the engine ECU 24, the torque commands Tm1* and Tm2* are transmitted to the motor ECU 40, the actual shift stage Ma is transmitted to the gearshift 130 (Step S320C), and the routine ends. The gearshift 130 receiving the actual shift stage Ma maintains the shift stage when the shift stage is an actual shift stage Ma, and shifts such that the shift stage is an actual shift stage Ma when the shift stage is not an actual shift stage Ma.

On the other hand, when the accelerator depression increasing time t is equal to or greater than the threshold value tref (Step S250), the base driving force Tdb is set as the effective driving force Td* (Step S330). The torque command Tm2* of the second motor MG2 is set using Expression (5) (Step S340C), the target engine power Pe* and the target engine rotation speed Ne* are transmitted to the engine ECU 24, the torque commands Tm1* and Tm2* are transmitted to the motor ECU 40, the actual shift stage Ma is transmitted to the gearshift 130 (Step S350C), and the routine ends.

Since the above-mentioned hybrid vehicle 120 according to the second embodiment functions in the same as the hybrid vehicle 20 according to the first embodiment, the same advantages as achieved in the hybrid vehicle 20 according to the first embodiment can be achieved. That is, when a driver depresses on the accelerator pedal 83, it is possible to cause the engine 22 to rotate depending on the vehicle speed V and to give a better driving feeling to the driver and to give a better driving feeling to the driver in comparison with a case in which the rotation speed Ne of the engine 22 increases rapidly before the vehicle speed V increases. Since the driving force output to the drive shaft 36 is more greatly corrected as the increase in accelerator depression amount ΔAcc increases, it is possible to obtain an acceleration force (responsiveness) corresponding to a driver's request.

Figure 22:
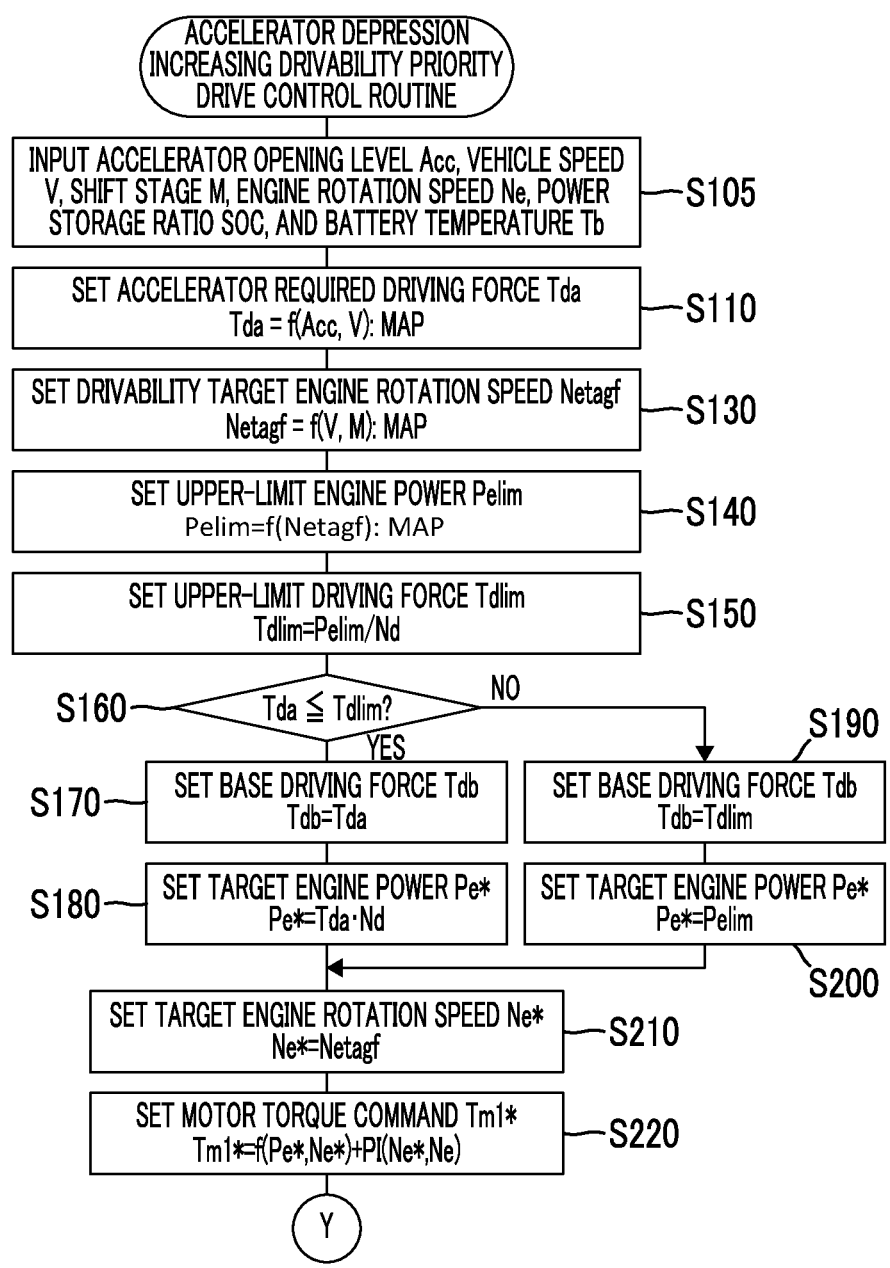
FIG. 22 is a flowchart illustrating an example of the accelerator depression increasing drivability priority drive control routine (a first half) according to the second embodiment which is performed by the HVECU when the accelerator depression amount increases at an M position in the second embodiment.

An operation when the shift position SP is the manual position (M position) in the hybrid vehicle 120 according to the second embodiment will be described below. In this case, the accelerator depression increasing drivability priority drive control routine (a first half) illustrated in FIG. 22 and the accelerator depression increasing drivability priority drive control routine (a second half) illustrated in FIG. 21 can be performed. The accelerator depression increasing drivability priority drive control routine (a first half) illustrated in FIG. 22 is the same as the accelerator depression increasing drivability priority drive control routine (a first half) illustrated in FIG. 20, except that the process (Step S105) of inputting the shift stage M as the shift position SP is added and the process of Step S120C of setting the shift stage M using the shift diagram illustrated in FIG. 19 is excluded. The differences are the same as described in the accelerator-depression increasing drivability priority drive control routine illustrated in FIG. 17 and thus description thereof will not be repeated.

In the hybrid vehicle 120 according to the second embodiment, the gearshift 130 of three shift stages is provided to constitute six shift stages including the virtual shift stages, but the gearshift 130 is not limited to the three shift stages and may have two shift stages or may have four or more shift stages. One virtual shift stage is disposed between neighboring shift stages of the gearshift, but a desired number of virtual shift stages such as one shift stage or two shift stages may be disposed in each shift stage of the gearshift or a desired number of virtual shift stages may be disposed in only a specific shift stage of the gearshift. The virtual shift stages may not be provided.

Correspondences between principal elements in the first embodiment and the second embodiment and principal elements of the disclosure described in "SUMMARY" will be described below. In the first embodiment and the second embodiment, the engine 22 is an example of the "engine." The first motor MG1 is an example of the "first motor." The drive shaft 36 is an example of the "drive shaft." The planetary gear set 30 is an example of the "planetary gear mechanism." The second motor MG2 is an example of the "second motor." The battery 50 is an example of the "battery." The HVECU 70, the engine ECU 24, and the motor ECU 40 that perform drive control in the normal driving mode or the accelerator depression increasing drivability priority drive control routine illustrated in FIGS. 2 and 3 correspond to the "electronic control unit."

The correspondences between principal elements in the first embodiment and the second embodiment and principal elements of the disclosure described in "SUMMARY" do not limit the elements of the disclosure described in the "SUMMARY" because the first embodiment and the second embodiment are an example for specifically describing the aspects for putting the disclosure described in the "SUMMARY" into practice. That is, analysis of the disclosure described in the "SUMMARY" has to be performed based on description thereof, and the first embodiment and the second embodiment are only a specific example of the disclosure described in the "SUMMARY."

While aspects of the disclosure have been described above with reference to the first embodiment and the second embodiment, but the disclosure is not limited to the first embodiment and the second embodiment and can be modified in various forms without departing from the gist of the disclosure.

The disclosure is applicable to the industry of manufacturing a hybrid vehicle.

What is claimed is:

1. A hybrid vehicle including an accelerator pedal operable by a driver, the hybrid vehicle comprising:
    an engine;
    a first motor;
    a planetary gear mechanism in which three rotary elements of the planetary gear mechanism are connected to an output shaft of the engine, a rotary shaft of the first motor, and a drive shaft connected to an axle of the hybrid vehicle, respectively;
    a second motor configured to input and output power to and from the drive shaft;
    a battery configured to exchange electric power with the first motor and the second motor; and
    an electronic control unit configured to
        (i) set a shift stage based on an accelerator depression amount and a vehicle speed of the hybrid vehicle, or an operation of the driver,
        (ii) set a target rotation speed of the engine based on the shift stage and the vehicle speed,
        (iii) set a base driving force based on the accelerator depression amount, the vehicle speed, and the target rotation speed,
        (iv) set a correction driving force such that the correction driving force increases with an increase in the accelerator depression amount, and
        (v) control the engine, the first motor, and the second motor such that a driving force obtained by adding the correction driving force to the base driving force is output to the drive shaft for the hybrid vehicle to travel.

2. The hybrid vehicle according to claim 1, wherein the electronic control unit is configured to control the second motor such that a power required for correcting the base driving force by using the correction driving force is covered with a power for charging and discharging the battery.

3. The hybrid vehicle according to claim 2, wherein the electronic control unit is configured to set the correction driving force to decrease as the accelerator depression amount decreases.

4. The hybrid vehicle according to claim 2, wherein the electronic control unit is configured to set the correction driving force to be smaller when the vehicle speed is higher than a predetermined vehicle speed range than when the vehicle speed is in the predetermined vehicle speed range.

5. The hybrid vehicle according to claim 2, wherein the electronic control unit is configured to set the correction driving force to gradually decrease with elapse of time.

6. The hybrid vehicle according to claim 2, wherein the electronic control unit is configured to set the correction driving force to decrease as a power storage ratio decreases, the power storage ratio being a ratio of a dischargeable power to a full capacity of the battery.

7. The hybrid vehicle according to claim 2, wherein the electronic control unit is configured to set the correction driving force to be smaller when a temperature of the battery is not in an appropriate temperature range than when the temperature is in the appropriate temperature range.

8. The hybrid vehicle according to claim 1, wherein the electronic control unit is configured to:
    (i) set a required driving force to be output to the drive shaft based on the accelerator depression amount and the vehicle speed;
    (ii) set a maximum power output from the engine when the engine operates at the target rotation speed, as an upper-limit power;
    (iii) set the driving force when the upper-limit power is output to the drive shaft, as an upper-limit driving force; and (iv) set a smaller driving force from among the upper-limit driving force and the required driving force, as the base driving force.

9. The hybrid vehicle according to claim 1, wherein the shift stage is a virtual shift stage.

10. The hybrid vehicle according to claim 1, further comprising:
   a stepped gearshift attached between the drive shaft and the planetary gear mechanism, wherein
   the shift stage is a shift stage of the stepped gearshift or a shift stage obtained by adding a virtual shift stage to the shift stage of the stepped gearshift.

* * * * *